US007158662B2

(12) United States Patent
Chiles

(10) Patent No.: US 7,158,662 B2
(45) Date of Patent: Jan. 2, 2007

(54) CURRENCY BILL AND COIN PROCESSING SYSTEM

(75) Inventor: Mark G. Chiles, Montgomery, TX (US)

(73) Assignee: Cummins-Allison Corp., Mount Prospect, IL (US)

( * ) Notice: Subject to any disclaimer, the term of this patent is extended or adjusted under 35 U.S.C. 154(b) by 782 days.

(21) Appl. No.: 10/368,144

(22) Filed: Feb. 18, 2003

(65) Prior Publication Data

US 2003/0182217 A1 Sep. 25, 2003

Related U.S. Application Data

(60) Provisional application No. 60/367,171, filed on Mar. 25, 2002.

(51) Int. Cl.
*G06K 9/00* (2006.01)
(52) U.S. Cl. .................... 382/135; 194/206; 705/35
(58) Field of Classification Search ............. 382/135, 382/136, 137, 138, 125; 235/375, 462.1, 235/46.2; 194/206, 207, 215, 216, 217; 702/33, 34; 705/35, 40
See application file for complete search history.

(56) References Cited

U.S. PATENT DOCUMENTS

| 2,922,893 | A | 1/1960 | Ett ........................ 250/219 |
| 3,245,534 | A | 4/1966 | Smith et al. ................ 382/7 |
| 3,246,295 | A | 4/1966 | DeClaris et al. ........... 382/56 |
| 3,280,974 | A | 10/1966 | Riddle et al. ........... 209/111.8 |
| 3,409,109 | A | 11/1968 | Iizuka et al. ................ 194/4 |
| 3,480,785 | A | 11/1969 | Aufderheide ............. 250/219 |
| 3,487,905 | A | 1/1970 | James, St. .................. 194/4 |
| 3,496,370 | A | 2/1970 | Haville et al. ............ 250/219 |
| 3,509,535 | A | 4/1970 | Berube ..................... 340/149 |
| 3,612,835 | A | 10/1971 | Andrews et al. ...... 235/61.11 D |
| 3,618,765 | A | 11/1971 | Cooper et al. ............ 209/534 |
| 3,635,321 | A | 1/1972 | Frazier, Sr. .................. 194/4 |
| 3,679,314 | A | 7/1972 | Mustert ..................... 356/71 |
| 3,759,382 | A | 9/1973 | Walkley et al. ......... 209/111.7 |

(Continued)

FOREIGN PATENT DOCUMENTS

DE 2760269 7/1977

(Continued)

OTHER PUBLICATIONS

Complaint Cummins-*Allison Corp.* v. *Glory Ltd.*, Glory Shoji Co. Ltd., and Glory (U.S.A.), Inc., Civil Action No. 02C-7008, N.D. Ill. 2002.

(Continued)

*Primary Examiner*—Jingge Wu
*Assistant Examiner*—Abolfazl Tabatabai
(74) *Attorney, Agent, or Firm*—Jenkens & Gilchrist

(57) ABSTRACT

A compact system for processing currency bills and coins comprises a compact currency bill processing device, a coin scale, and a processor communicatively linked to the currency bill processing device and the coin scale. The compact currency bill processing device counts currency bills of a plurality of denominations. The compact currency bill processing includes an evaluation unit being that is adapted to determine the denomination of each of the currency bills. The coin scale is adapted to receive at least one group of coins of a single denomination and to determine a coin total for the at least one received group corresponding to the value of the coins in the received group. The processor is adapted to receive a currency bill total from the currency bill processing device and the coin total from the coin scale and to determine an aggregate total corresponding to the sum of the received currency bill total and the coin total.

73 Claims, 17 Drawing Sheets

U.S. PATENT DOCUMENTS

| | | | |
|---|---|---|---|
| 3,764,899 A | 10/1973 | Peterson et al. | 324/61 R |
| 3,778,628 A | 12/1973 | Novak et al. | 250/556 |
| 3,815,021 A | 6/1974 | Kerr | 324/61 R |
| 3,842,281 A | 10/1974 | Goodrich | 250/461 |
| 3,870,629 A | 3/1975 | Carter et al. | 209/111.8 |
| 3,906,449 A | 9/1975 | Marchak | 340/149 R |
| 3,952,183 A | 4/1976 | Abe | 235/92 SB |
| 3,976,198 A | 8/1976 | Carnes et al. | 209/111.7 T |
| 4,041,456 A | 8/1977 | Ott et al. | 340/146.3 R |
| 4,081,131 A | 3/1978 | Sand et al. | 235/419 |
| 4,096,991 A | 6/1978 | Iquchi | 435/419 |
| 4,114,804 A | 9/1978 | Jones et al. | 235/476 |
| 4,147,430 A | 4/1979 | Gorgone et al. | 356/51 |
| 4,164,770 A | 8/1979 | Jeffers | 360/113 |
| 4,166,945 A | 9/1979 | Inoyama et al. | 235/379 |
| 4,167,458 A | 9/1979 | Louzos et al. | 204/14 |
| 4,179,685 A | 12/1979 | O'Maley | 340/146.3 H |
| 4,243,216 A | 1/1981 | Mazumder | 271/122 |
| 4,250,806 A | 2/1981 | Boyson et al. | 101/2 |
| 4,255,651 A | 3/1981 | Phillips | 235/92 |
| 4,275,874 A | 6/1981 | DiBlasio | 271/187 |
| 4,277,774 A | 7/1981 | Fujii et al. | 340/146.3 |
| 4,283,708 A | 8/1981 | Lee | 340/146.3 Z |
| 4,288,781 A | 9/1981 | Sellner et al. | 358/486 |
| 4,302,781 A | 11/1981 | Ikeda et al. | 358/486 |
| 4,311,914 A | 1/1982 | Huber | 250/556 |
| 4,313,598 A | 2/1982 | DiBlasio | 271/124 |
| 4,334,619 A | 6/1982 | Horino et al. | 209/551 |
| 4,348,656 A | 9/1982 | Gorgone et al. | 340/146.3 R |
| 4,349,111 A | 9/1982 | Shah et al. | 209/534 |
| 4,352,988 A | 10/1982 | Ishida | 250/559 |
| 4,355,300 A | 10/1982 | Weber | 340/146.3 C |
| 4,356,473 A | 10/1982 | Freudenthal | 340/146.3 H |
| 4,365,700 A | 12/1982 | Arimato et al. | 194/2 |
| 4,381,447 A | 4/1983 | Horvath et al. | 250/223 |
| 4,386,432 A | 5/1983 | Nakamura et al. | 382/7 |
| 4,388,662 A | 6/1983 | Jeffers et al. | 360/113 |
| 4,413,296 A | 11/1983 | Jeffers | 360/113 |
| 4,416,449 A | 11/1983 | McInerny | 271/122 |
| 4,420,153 A | 12/1983 | Winkler et al. | 271/304 |
| 4,442,541 A | 4/1984 | Finkel et al. | 382/7 |
| 4,461,028 A | 7/1984 | Okubo | 382/15 |
| 4,464,786 A | 8/1984 | Nishito et al. | 382/7 |
| 4,464,787 A | 8/1984 | Fish et al. | 382/7 |
| 4,470,496 A | 9/1984 | Steiner | 194/4 C |
| RE31,692 E | 10/1984 | Tyburski et al. | 382/7 |
| 4,479,049 A | 10/1984 | Hirose | 235/279 |
| 4,480,177 A | 10/1984 | Allen | 235/379 |
| 4,482,058 A | 11/1984 | Steiner | 209/534 |
| 4,487,306 A | 12/1984 | Nao et al. | 382/135 |
| 4,490,846 A | 12/1984 | Ishida et al. | 382/7 |
| 4,503,963 A | 3/1985 | Steiner | 194/4 |
| 4,513,439 A | 4/1985 | Gorgone et al. | 382/7 |
| 4,532,641 A | 7/1985 | Nishimura | 377/14 |
| 4,539,702 A | 9/1985 | Oka | 382/7 |
| 4,542,829 A | 9/1985 | Emery et al. | 209/534 |
| 4,547,896 A | 10/1985 | Ohtombe et al. | 382/318 |
| 4,553,846 A | 11/1985 | Hilton et al. | 356/429 |
| 4,556,140 A | 12/1985 | Okada | 194/4 |
| 4,557,597 A | 12/1985 | Iwama | 356/71 |
| 4,558,224 A | 12/1985 | Gober | 250/460.1 |
| 4,559,451 A | 12/1985 | Curl | 250/560 |
| 4,559,452 A | 12/1985 | Igaki et al. | 250/560 |
| 4,563,771 A | 1/1986 | Gorgone et al. | 382/7 |
| 4,567,370 A | 1/1986 | Falls | 250/461.1 |
| 4,587,412 A | 5/1986 | Apisdorf | 235/449 |
| 4,587,434 A | 5/1986 | Roes et al. | 250/556 |
| 4,588,292 A | 5/1986 | Collins | 356/71 |
| 4,592,090 A | 5/1986 | Curl et al. | 382/7 |
| 4,593,184 A | 6/1986 | Bryce et al. | 235/449 |
| 4,611,345 A | 9/1986 | Ohnishi et al. | 382/7 |
| 4,625,870 A | 12/1986 | Nao et al. | 209/534 |
| 4,628,194 A | 12/1986 | Dobbins et al. | 235/379 |
| 4,645,936 A | 2/1987 | Gorgone | 250/556 |
| 4,653,647 A | 3/1987 | Hashioto | 209/534 |
| 4,658,289 A | 4/1987 | Nagano et al. | 358/75 |
| 4,677,682 A | 6/1987 | Miyaqawa et al. | 382/7 |
| 4,681,229 A | 7/1987 | Uesaka et al. | 209/534 |
| 4,683,508 A | 7/1987 | Jeffers et al. | 360/113 |
| 4,690,268 A | 9/1987 | Ueshin | 198/399 |
| 4,694,963 A | 9/1987 | Takesako | 209/534 |
| 4,697,071 A | 9/1987 | Hiraoka et al. | 235/379 |
| 4,700,368 A | 10/1987 | Munn et al. | 377/8 |
| 4,707,843 A | 11/1987 | McDonald | 377/8 |
| 4,716,456 A | 12/1987 | Hosaka | 358/75 |
| 4,728,096 A * | 3/1988 | Winkler et al. | 271/166 |
| 4,733,308 A | 3/1988 | Nakamura et al. | 358/496 |
| 4,747,492 A | 5/1988 | Saito et al. | 209/534 |
| 4,749,076 A | 6/1988 | Akagawa et al. | 194/207 |
| 4,749,087 A | 6/1988 | Buttifant | 382/7 |
| 4,761,002 A | 8/1988 | Reed et al. | 271/111 |
| 4,764,725 A | 8/1988 | Bryce | 324/234 |
| 4,764,976 A | 8/1988 | Kallin et al. | 382/65 |
| 4,784,274 A | 11/1988 | Mori et al. | |
| 4,787,518 A | 11/1988 | Yuge et al. | 209/534 |
| 4,817,176 A | 3/1989 | Marshall et al. | 382/43 |
| 4,820,909 A | 4/1989 | Kawaucki et al. | 235/379 |
| 4,823,393 A | 4/1989 | Kawakami | 382/7 |
| 4,825,246 A | 4/1989 | Fukuchi et al. | 355/4 |
| 4,827,531 A | 5/1989 | Milford | 382/7 |
| 4,841,358 A | 6/1989 | Kammato et al. | 358/75 |
| 4,850,468 A | 7/1989 | Kobayashi et al. | 194/207 |
| 4,881,268 A | 11/1989 | Uchida et al. | 382/7 |
| 4,905,840 A | 3/1990 | Yuge et al. | 209/534 |
| 4,906,988 A | 3/1990 | Copella | 340/825 |
| 4,908,516 A | 3/1990 | West | 250/556 |
| 4,922,109 A | 5/1990 | Bercovitz et al. | 250/556 |
| 4,973,851 A | 11/1990 | Lee | 250/556 |
| 4,984,280 A | 1/1991 | Abe | 382/7 |
| 4,984,692 A | 1/1991 | Obara | 209/583 |
| 4,985,614 A | 1/1991 | Pease et al. | 235/440 |
| 4,992,860 A | 2/1991 | Hamaquchi et al. | 358/75 |
| 4,996,604 A | 2/1991 | Oqawa et al. | 358/486 |
| 5,012,932 A | 5/1991 | Omura et al. | 209/534 |
| 5,020,787 A | 6/1991 | Arikawa | 271/3 |
| 5,027,415 A | 6/1991 | Hara et al. | 382/135 |
| 5,047,871 A | 9/1991 | Meyer et al. | 358/486 |
| 5,051,900 A | 9/1991 | Ito et al. | 364/408 |
| 5,054,621 A | 10/1991 | Murphy et al. | 209/534 |
| 5,055,834 A | 10/1991 | Chiba | 382/135 |
| 5,068,519 A | 11/1991 | Bryce | 235/449 |
| 5,076,441 A | 12/1991 | Gerlier | 209/534 |
| 5,105,364 A | 4/1992 | Kawamura et al. | 364/478 |
| 5,119,025 A | 6/1992 | Smith et al. | 324/252 |
| 5,122,754 A | 6/1992 | Gotaas | 324/676 |
| 5,146,067 A | 9/1992 | Sloan et al. | 235/381 |
| 5,151,607 A | 9/1992 | Crane et al. | 250/556 |
| 5,163,672 A | 11/1992 | Mennie | 271/187 |
| 5,167,313 A | 12/1992 | Dobbins et al. | 194/317 |
| 5,167,411 A | 12/1992 | Isobe | 271/273 |
| 5,172,907 A | 12/1992 | Kalisiak | 271/227 |
| 5,183,142 A | 2/1993 | Latchinian et al. | 194/206 |
| 5,199,543 A | 4/1993 | Kamagami et al. | 194/207 |
| 5,201,395 A | 4/1993 | Takizawa et al. | 194/206 |
| 5,207,788 A | 5/1993 | Geib | 271/122 |
| 5,220,395 A | 6/1993 | Yamashita et al. | 355/313 |
| 5,236,072 A | 8/1993 | Cargill | 194/207 |
| 5,240,116 A | 8/1993 | Stevens et al. | 209/534 |
| 5,242,041 A | 9/1993 | Isobe | 194/207 |
| 5,251,738 A * | 10/1993 | Dabrowski | 194/206 |
| 5,259,490 A | 11/1993 | Gardellini | 194/207 |
| 5,261,518 A | 11/1993 | Bryce | 194/206 |
| 5,295,196 A | 3/1994 | Raterman et al. | 382/7 |
| 5,297,030 A | 3/1994 | Vassigh et al. | 364/405 |

| Patent Number | Date | Inventor | Class |
|---|---|---|---|
| 5,301,786 A | 4/1994 | Yoshihara | 194/207 |
| 5,304,813 A | 4/1994 | DeMan | 250/556 |
| 5,308,992 A | 5/1994 | Crane et al. | 250/556 |
| 5,309,515 A | 5/1994 | Troung et al. | 382/7 |
| 5,341,408 A | 8/1994 | Melcher et al. | 377/8 |
| 5,358,088 A | 10/1994 | Barnes et al. | 194/206 |
| 5,363,949 A | 11/1994 | Matsubayashi | 194/206 |
| 5,367,577 A | 11/1994 | Gotaas | 382/135 |
| 5,394,992 A | 3/1995 | Winkler | 209/552 |
| 5,397,003 A | 3/1995 | Stevens et al. | 209/534 |
| 5,402,895 A | 4/1995 | Mikkelsen et al. | |
| 5,408,417 A | 4/1995 | Wilder | 364/479 |
| 5,418,458 A | 5/1995 | Jeffers | 324/235 |
| 5,419,423 A | 5/1995 | Ishida et al. | 194/206 |
| 5,421,443 A | 6/1995 | Hatamachi et al. | 194/206 |
| 5,430,664 A | 7/1995 | Cargill et al. | 364/550 |
| 5,437,357 A | 8/1995 | Ota et al. | 385/135 |
| 5,465,821 A | 11/1995 | Akioka | 194/207 |
| 5,467,405 A | 11/1995 | Raterman et al. | 382/135 |
| 5,467,406 A | 11/1995 | Graves et al. | 382/135 |
| 5,478,992 A | 12/1995 | Hamada et al. | 235/379 |
| D369,984 S | 5/1996 | Larsen | D10/97 |
| 5,547,062 A | 8/1996 | Mays et al. | |
| 5,553,320 A | 9/1996 | Matsuura et al. | 235/379 |
| 5,577,589 A | 11/1996 | Garcia Tinoco | 194/204 |
| 5,607,040 A | 3/1997 | Mathurin, Sr. | 194/207 |
| 5,616,915 A | 4/1997 | Simpkins et al. | 250/221 |
| 5,633,949 A | 5/1997 | Graves et al. | 382/135 |
| 5,639,081 A | 6/1997 | Hatamachi et al. | 271/177 |
| 5,640,463 A | 6/1997 | Csulits | 382/135 |
| 5,652,802 A | 7/1997 | Graves et al. | 382/135 |
| 5,657,846 A | 8/1997 | Schwartz | 194/206 |
| 5,680,472 A | 10/1997 | Conant | 382/135 |
| 5,687,963 A | 11/1997 | Mennie | 271/119 |
| 5,692,067 A * | 11/1997 | Raterman et al. | 382/135 |
| 5,704,491 A | 1/1998 | Graves | 209/534 |
| 5,724,438 A | 3/1998 | Graves | 382/135 |
| 5,751,840 A | 5/1998 | Raterman et al. | 382/135 |
| 5,761,089 A | 6/1998 | McInerny | 364/550 |
| 5,790,693 A | 8/1998 | Graves et al. | 382/135 |
| 5,790,697 A | 8/1998 | Jones et al. | 382/135 |
| 5,806,650 A | 9/1998 | Mennie et al. | 194/206 |
| 5,815,592 A | 9/1998 | Mennie et al. | 382/135 |
| 5,822,448 A | 10/1998 | Graves et al. | 382/135 |
| 5,832,104 A | 11/1998 | Graves et al. | 382/135 |
| 5,867,589 A | 2/1999 | Graves et al. | 382/135 |
| 5,870,487 A | 2/1999 | Graves et al. | 382/135 |
| 5,875,259 A | 2/1999 | Mennie et al. | 382/135 |
| 5,905,810 A | 5/1999 | Jones et al. | 382/135 |
| 5,909,502 A | 6/1999 | Mazur | 382/135 |
| 5,909,503 A | 6/1999 | Graves et al. | 382/135 |
| 5,912,982 A | 6/1999 | Munro et al. | 382/135 |
| 5,915,518 A | 6/1999 | Hopwood et al. | 194/207 |
| 5,938,044 A | 8/1999 | Weggesser | 209/534 |
| 5,940,623 A | 8/1999 | Watts et al. | 395/712 |
| 5,943,655 A | 8/1999 | Jacobsen | 705/30 |
| 5,960,103 A | 9/1999 | Graves et al. | 382/135 |
| 5,966,456 A | 10/1999 | Jones et al. | 382/135 |
| 5,975,273 A | 11/1999 | Zwahlen et al. | 194/206 |
| 5,982,918 A | 11/1999 | Mennie et al. | 382/135 |
| 5,992,600 A | 11/1999 | Baudat | 194/207 |
| 5,992,601 A * | 11/1999 | Mennie et al. | 194/207 |
| 6,012,564 A | 1/2000 | Mukai | 194/206 |
| 6,012,565 A | 1/2000 | Mazur | 194/207 |
| 6,021,883 A | 2/2000 | Casanova et al. | 194/217 |
| 6,026,175 A | 2/2000 | Munro et al. | 382/135 |
| 6,028,951 A | 2/2000 | Raterman et al. | 382/135 |
| 6,039,645 A | 3/2000 | Mazur | 453/10 |
| 6,068,194 A | 5/2000 | Mazur | 235/492 |
| 6,072,896 A | 6/2000 | Graves et al. | 382/135 |
| 6,073,744 A | 6/2000 | Raterman et al. | 194/207 |
| 6,074,334 A | 6/2000 | Mennie et al. | 493/438 |
| 6,128,402 A | 10/2000 | Jones et al. | 382/135 |
| 6,162,122 A | 12/2000 | Acres et al. | 463/29 |
| 6,220,419 B1 | 4/2001 | Mennie | 194/207 |
| 6,234,294 B1 | 5/2001 | Defeo et al. | 194/207 |
| 6,237,739 B1 | 5/2001 | Mazur et al. | 194/207 |
| 6,241,069 B1 | 6/2001 | Mazur et al. | 194/207 |
| 6,256,407 B1 | 7/2001 | Mennie et al. | 382/135 |
| 6,278,795 B1 | 8/2001 | Anderson et al. | 382/135 |
| 6,311,819 B1 | 11/2001 | Stromme et al. | 194/207 |
| 6,318,537 B1 | 11/2001 | Jones et al. | 194/346 |
| 6,351,551 B1 | 2/2002 | Munro et al. | 382/135 |
| 6,363,164 B1 | 3/2002 | Jones et al. | 382/135 |
| 6,371,303 B1 | 4/2002 | Klein et al. | 209/534 |
| 6,378,683 B1 | 4/2002 | Mennie | 194/207 |
| 6,381,354 B1 | 4/2002 | Mennie et al. | 382/135 |
| 6,398,000 B1 | 6/2002 | Jenrick et al. | 194/200 |
| 6,459,806 B1 | 10/2002 | Raterman et al. | 382/135 |
| 6,460,705 B1 | 10/2002 | Hallowell | 209/534 |
| 6,493,461 B1 | 12/2002 | Mennie et al. | 382/135 |
| 6,539,104 B1 | 3/2003 | Raterman et al. | 382/135 |
| 6,560,355 B1 | 5/2003 | Graves et al. | 382/135 |
| 6,588,569 B1 | 7/2003 | Jenrick et al. | 194/206 |
| 6,601,687 B1 | 8/2003 | Jenrick et al. | 194/206 |
| 6,603,872 B1 | 8/2003 | Jones et al. | 382/135 |
| 6,621,919 B1 | 9/2003 | Mennie et al. | 382/135 |
| 6,628,816 B1 | 9/2003 | Mennie et al. | 382/135 |
| 6,636,624 B1 | 10/2003 | Raterman et al. | 382/135 |
| 2001/0019624 A1 | 9/2001 | Raterman et al. | 382/135 |
| 2001/0035603 A1 | 11/2001 | Graves et al. | 271/265.01 |
| 2002/0001393 A1 | 1/2002 | Jones et al. | 382/100 |
| 2002/0020603 A1 | 2/2002 | Jones et al. | 194/346 |
| 2002/0056605 A1 | 5/2002 | Mazur et al. | 194/207 |
| 2002/0085245 A1 | 7/2002 | Mennie et al. | 358/498 |
| 2002/0085745 A1 | 7/2002 | Jones et al. | 382/135 |
| 2002/0103757 A1 | 8/2002 | Jones et al. | 705/45 |
| 2002/0104785 A1 | 8/2002 | Klein et al. | 209/534 |
| 2002/0107801 A1 | 8/2002 | Jones et al. | 705/45 |
| 2002/0118871 A1 | 8/2002 | Jones et al. | 382/137 |
| 2002/0122580 A1 | 9/2002 | Jones et al. | 382/137 |
| 2002/0126885 A1 | 9/2002 | Mennie et al. | 382/135 |
| 2002/0126886 A1 | 9/2002 | Jones et al. | 382/135 |
| 2002/0131630 A1 | 9/2002 | Jones et al. | 382/137 |
| 2002/0136442 A1 | 9/2002 | Jones et al. | 382/135 |
| 2002/0145035 A1 | 10/2002 | Jones | 235/379 |
| 2002/0154804 A1 | 10/2002 | Jones et al. | 382/135 |
| 2002/0154805 A1 | 10/2002 | Jones et al. | 382/135 |
| 2002/0154806 A1 | 10/2002 | Jones et al. | 382/135 |
| 2002/0154807 A1 | 10/2002 | Jones et al. | 382/135 |
| 2002/0154808 A1 | 10/2002 | Jones et al. | 382/135 |
| 2003/0009420 A1 | 1/2003 | Jones | 705/39 |
| 2003/0015395 A1 | 1/2003 | Hallowell et al. | 194/206 |
| 2003/0015396 A1 | 1/2003 | Mennie | 194/206 |
| 2003/0059098 A1 | 3/2003 | Jones et al. | 382/135 |
| 2003/0062242 A1 | 4/2003 | Hallowell et al. | 194/302 |
| 2003/0081824 A1 | 5/2003 | Mennie et al. | 382/135 |
| 2003/0108233 A1 | 6/2003 | Raterman et al. | 382/135 |
| 2003/0121752 A1 | 7/2003 | Stromme et al. | 194/207 |
| 2003/0121753 A1 | 7/2003 | Stromme et al. | 194/207 |
| 2003/0132281 A1 | 7/2003 | Jones et al. | 235/379 |
| 2003/0139994 A1 | 7/2003 | Jones | 705/36 |
| 2003/0168310 A1 | 9/2003 | Strauts et al. | 194/302 |
| 2003/0182217 A1 | 9/2003 | Chiles | 705/35 |

FOREIGN PATENT DOCUMENTS

| | | |
|---|---|---|
| DE | 2659929 | 11/1977 |
| DE | 2935668 | 9/1979 |
| EP | 0077464 | 4/1983 |
| EP | 0130824 | 6/1984 |
| EP | 0130825 | 6/1984 |
| EP | 0132329 | 6/1984 |
| EP | 0206675 | 6/1986 |
| EP | 0253935 | 10/1986 |
| EP | 0264125 | 10/1987 |

| | | |
|---|---|---|
| EP | 0325364 | 7/1989 |
| EP | 0338123 | 10/1989 |
| EP | 0342647 | 11/1989 |
| EP | 0487 316 | 5/1992 |
| EP | 0613 107 | 8/1994 |
| GB | 2038063 | 7/1980 |
| GB | 2061232 | 5/1981 |
| GB | 2088832 | 6/1982 |
| GB | 2119138 | 11/1983 |
| GB | 2190996 | 12/1987 |
| GB | 2204166 | 11/1988 |
| JP | 54-60999 | 6/1979 |
| JP | 54-71673 | 6/1979 |
| JP | 54-71674 | 6/1979 |
| JP | 55-52538 | 12/1980 |
| JP | 56-16287 | 2/1981 |
| JP | 56-136689 | 10/1981 |
| JP | 58-139296 | 8/1983 |
| JP | 59-186079 | 10/1984 |
| JP | 59-231692 | 12/1984 |
| JP | 60-191379 | 9/1985 |
| JP | 60-215293 | 11/1985 |
| JP | 61-14557 | 4/1986 |
| JP | 61-82290 | 4/1986 |
| JP | 61-41439 | 9/1986 |
| JP | 62-220843 | 9/1987 |
| JP | 63-91794 | 4/1988 |
| JP | 63-271687 | 11/1988 |
| JP | 63-276688 | 11/1988 |
| JP | 64-64090 | 3/1989 |
| JP | 2-22786 | 1/1990 |
| JP | 2-12492 | 2/1990 |
| JP | 5-11355 | 7/1993 |
| WO | WO 81/01211 | 4/1981 |
| WO | WO 87/06041 | 10/1987 |
| WO | WO 90/07165 | 6/1990 |
| WO | WO 91/11778 | 8/1991 |
| WO | WO 92/17394 | 10/1992 |
| WO | WO 93/23824 | 11/1993 |
| WO | WO 94/19773 | 9/1994 |
| WO | WO 95/24691 | 9/1995 |
| WO | WO 96/10800 | 4/1996 |
| WO | WO 97/30422 | 2/1997 |

OTHER PUBLICATIONS

Redacted Declaration of Hiroya Mouri (12 pages) (Nov. 19, 2002).
Glory Model UF-1, Instruction Manual (30 pages) (date uncertain, prior to Nov. 20, 2002)(Japanese)[Nov. 19, 2002 Mouri Ex. 1].
Glory Model UF-1, Translation of Instruction Manual—(29 pages) (date uncertain, prior to Nov. 20, 2002) (Glory's translation) [Nov. 19, 2002 Mouri Ex. 1a].
Glory UF-1 brochure (2 page)(date unknown, prior to Nov. 20, 2002) (Japanese) [Nov. 19, 2002 Mouri Ex. 2].
Glory GFB-30 brochure (2 page) (date unknown, prior to Nov. 20, 2002) (Japanese) [Nov. 19, 2002 Mouri Ex. 3].
Glory GFB-30 operation manual (16 pages) (date unknown, prior to Nov. 20, 2002) (Japanese) [Nov. 19, 2002 Mouri Ex. 6].
Glory GSA-500 Service Manual (119 pages) (May 1989) [Nov. 19, 2002 Mouri Ex. 5].
Glory GFU-200 operator manual (26 pages) (date unknown, first page marked 92-3-2) (Japanese) [Nov. 19, 2002 Mouri Ex. 8].
Glory GFR-110 Instruction Manual—Currency Reader Counter (26 pages) (dated Aug. 23, 1999) [Nov. 19, 2002 Mouri Ex. 10].
Glory GFR-S Series Currency Counters/Discriminators GFR-S60; GFR-S80; GFR-S80V (4 pages) (date © 2002) [Nov. 19, 2002 Mouri Ex. 12].
Declaration of Sadaaki Uesaka (7 pages) (Nov. 19, 2002).
Glory's Monthly Newsletter, Jun. 1985 (38 pages) (Japanese) [Nov. 19, 2002 Uesaka Ex. 2].
Glory's Monthly Newsletter, Jun. 1985—partial translation (4 pages) [Nov. 19, 2002 Uesaka Ex. 3].
Glory Money O.A. Catalog, Jun. 1989 (44 pages) (Japanese) [Nov. 19, 2002 Uesaka Ex. 5].
Declaration of Akira Hoyo (5 pages) (Nov. 15, 2002).
Billcon D-202/204 Service Manual—Second Translation (Glory) (cover marked 630229) (25 pages) [Nov. 15, 2002 Hoyo Ex. 2a].
Billcon D-202/204—Nikkin Newspaper ad, Apr. 17, 1987 (2 pages) (Japanese) [Nov. 15, 2002 Hoyo Ex. 3].
Billcon D-202/204—Nikkin Newspaper ad, Apr. 17, 1987 (2 pages) (English translation) [Nov. 15, 2002 Hoyo Ex. 3a].
Billcon D-202/204 brochure (2 pages) (date uncertain, prior to Nov. 20, 2002) (Japanese) [Nov. 15, 2002 Hoyo Ex. 5].
Billcon D-202/204 brochure (2 pages) (date uncertain, prior to Nov. 20, 2002) (English translation) [Nov. 15, 2002 Hoyo Ex. 5a].
Billcon D-202/204 videotape of Japanese television show entitled "Small and Worldwide Companies" (allegedly aired Jan. 10, 1988) (Japanese) [Nov. 15, 2002 Hoyo Ex. 6].
Declaration of Philip C. Dolsen (6 pages)(Nov. 20, 2002).
Dolsen, Philip C. Cirriculum (4 pages) (Oct. 29, 2002) [Nov. 20, 2002 Dolsen Ex. 1].
OKI Semiconductor data book, MSM80C85A-2RS/GS/JS—8 Bit CMOS Microprocessor (10 pages) (alleged Mar. 1989) [Nov. 20, 2002 Dolsen Ex. 3A].
OKI Semiconductor data book, MSM80C88A-2RS/GS/JS—8 Bit CMOS Microprocessor (27 pages) (alleged Mar. 1989) [Nov. 20, 2002 Dolsen Ex. 3B].
Intel 80286, Intel data sheet, High Performance Microprocessor with Memory Management and Protection (28 pages; pp. 3-1 to 3-55) (alleged 1988) [Nov. 20, 2002 Dolsen Ex. 4].
NEC uPD780C-1 Microprocessor, NEC data book (23 pages; pp. 4-3 to 4-25) (alleged 1987) [Nov. 20, 2002 Dolsen Ex. 5].
NEC PD70216 processor, NEC data book (34 pages; pp. 3-161 to 3-227) (alleged 1987) [Nov. 20, 2002 Dolsen Ex. 6].
Dolsen claim chart for claims 40-43, 46-48, 76-78, 81, 101, 105, 108, 110-111 U.S. Pat. No. 6,459,806 [Nov. 20, 2002 Dolsen Ex. 7].
Glory GFR-S80V Operation Keys, pp. 1-11 (May 17, 2002) English (GL000106-116).
Glory Catalog pp. 4-11 listing various Glory machines including GFU-100, GFF-8CF, GFF-8, GFB-500/520, GFF-8E, and GSA-500 and maintenance policy and fees, English (GL001916-1923) (date uncertain, last page dated Aug. 15, 1990).
De La Rue 3000 Series Used banknote sorting machines, 10 legal size pages, English (GL001924-33) (date uncertain, prior to Nov. 4, 2002).
De La Rue 3400/3500 Series High Speed Currency Sorting Systems brochure, 4 pages, English (GL001934-37)(© 1989).
The New Billcon K-300 Series brochure, 2 pages, English (GL002389-90) (Dec. 1999).
The New Billcon N-Series Compact Note Counter brochure, 2 pages, English (GL002391-92) (© 2000).
The New Billcon K-300 Series Brochure, 2 pages, (© 1999) English (GL002396-97).
Billcon D-202/204 brochure, 2 pages, Japanese (date uncertain, prior to Nov. 7, 2002) (GL002398-99).
De La Rue Teller Cash Dispatch™ Applications brochure, 8 pages, (© 1999) English (GL002475-2482).
De La Rue Cash Systems, Coin Processing Banknote Counting brochure, 4 legal pages, (date uncertain, prior to Nov. 7, 2002) English (G1002485-88).
De La Rue Cash Systems, 2650 Currency Counting Machine brochure, 2 pages, (date uncertain, prior to Nov. 7, 2002) English (GL002489-90).
De La Rue Cash Systems, The Euro Range for Note and Coin Handling brochure, 4 pages, (date uncertain, prior to Nov. 7, 2002) English (GL002491-94).
Currency Systems International Cobra™ Banknote Sorter brochure, 3 pages, (© 2001) English (GL002495-97).
De La Rue Cash Systems Cobra™ 4004 Banknote Sorter brochure, 2 legal pages, (© 2001) English (GL002498-99).
De La Rue Cash Systems TCR Twin Safe™ Teller Cash Recycler, 2 pages, (© 2001) English (GL002500-01).
De La Rue's WestLB Panmure Marketing Pamphlet regarding Cash Systems Division, 16 pages, (Apr. 29, 2002) English (GL002502-17).

De La Rue Cash Systems 2800 VB Value Balancing currency counter brochure, 2 pages (Sep. 1999) English (GL002518-19).
De La Rue Cash Systems 8672 Máquina contadora de billetes brochure, 2 pages (date uncertain, handwritten date Nov. 1999) (Spanish) (GL002520-21).
Sprintquip Quicksort™ 2800 brochure, 2 pages, (hand dated Sep. 1999) English (GL002523-24).
Brandt® Model 8643 Currency/Document Counter brochure, 2 pages, (© 1995) English (GL002527-28).
De La Rue Cash Systems 2700VB Currency Counting Machine brochure, 2 pages (hand dated Sep. 1999) English (GL002529-30).
De La Rue Cash Systems Brandt 8625 Currency Counting Machine, 2 pages (hand dated Nov. 1999) English (GL002531-32).
De La Rue Cash Systems Branch Cash Automation Applications (Powerpoint), 28 pages, (date uncertain, prior to Nov. 7, 2002) English (GL002539-66).
De La Rue Commercial Self Service (Powerpoint), 24 pages, (date uncertain, prior to Nov. 7, 2002) English (GL002567-90).
De La Rue Automated Depositories (Powerpont), 2 pages, (date uncertain, prior to Nov. 7, 2002) English (GL002591-92).
De La Rue Systems 2800VB Balancing Sorter/Counter brochure, 2 pages, (date uncertain, prior to Nov. 7, 2002) English (GL002593-94).
De La Rue Systems 2700 VB Specification page of brochure, 1 page, (date uncertain, prior to Nov. 7, 2002) English (GL002595).
Magner® 15 Desktop banknote counter brochure, 2 pages, (date uncertain, prior to Nov. 7, 2002) English (G1002596-97).
MAG II Model 20 Currency Counter, 2 pages, (date uncertain, prior to Nov. 7, 2002) English (GL002605-06).
Banc Equip Magner Products Product Price List, 2 pages, (date uncertain, prior to Nov. 7, 2002) English (GL002613-14).
Magner Model 35 Currency Counting Machines brochure, 2 pages, (date uncertain, prior to Nov. 7, 2002) English (GL002625-26).
Magner 75 Series Currency Counting Machines brochure, 2 pages, (date uncertain, prior to Nov. 7, 2002) English (GL002627-28).
G&D BPS 200 Desktop Banknote Processing System brochure, 10 pages, (date uncertain, prior to Nov. 7, 2002) English (GL002629-38).
G&D BPS 200 Desktop Banknote Processing System brochure, 2 pages, (date uncertain, prior to Nov. 7, 2002) English (GL002643-44).
G&D One Size Does Not Fit All! Brochure, 1 page, (date uncertain, prior to Nov. 7, 2002) English (GL002645).
G&D BPS 500 Banknote Processing System Brochure, 4 pages, (date uncertain, prior to Nov. 7, 2002) English (GL002646-49).
G&D Numeron webpage picture of sorting machine and Design Award for Numeron, 2 page, (Mar. 29, 2002) (GL002650-51).
G&D BPS 200 Banknote Processing System brochure, 2 pages, (date uncertain, prior to Nov. 7, 2002) English (GL002652-53).
G&D BPS 500 Banknote Processing System brochure, 1 page (hand dated Sep. 1999) English (GL002654).
G&D Company Magazine, 36 pages, (Mar. 1998) English (GL002655-90).
G&D Cards and Card Systems brochure, 15 pages, (© 1998) English (GL002691-2705).
G&D Portrait of a Company Group brochure, 19 pages, (© 1997?) English (GL002706-24).
Mosler TouchSort™ Plus Currency Processing System brochure, 2 pages (© 1999) English (GL002727-28).
Mosler Satellite Branch Facilities—Riddell National Bank, Brazil, Indiana brochure, 1 page, (date uncertain, prior to Nov. 7, 2002) English (GL002729).
Mosler TouchSort™ Currency Processing System brochure, 2 pages, (date uncertain, prior to Nov. 7, 2002) English (GL002730-31).
Mosler marketing brochure, 4 pages, (© 1999) English, (GL002732-35).
Glory UC-10-10A Brochure, 2 pages, (date uncertain, prior to Nov. 7, 2002) Japanese (GL002777-78).
Glory UC-10A pamphlet, 1 legal page, (date uncertain, prior to Nov. 7, 2002) Japanese (GL002779).
Glory pamphlet of various machines, 1 legal page, (date uncertain, prior to Nov. 7, 2002) Japanese (GL002780).
Glory UF-1 brochure, 2 pages, (date uncertain, prior to Nov. 7, 2002) Japanese (GL002781-82).
Glory GFU-200 Desk-top Currency Fitness Sorter/Counter brochure, 2 pages, (date uncertain, prior to Nov. 7, 2002) English (GL002839-40).
Glory GFR-100 Currency Reader brochure, 4 pages, (© 1995) English (GL002860-63).
Glory GFR-100 Currency Reader Counter Instruction Manual, 31 pages (Jan. 8, 1996) English (GL002864-94).
Glory Tank Currency Discriminators GFR-110 & GFR-S80 brochure, 2 pages, (© 2000) English (GL002959-60).
Glory Currency Reader Counter GFR-S80, S60 Instruction Manual, 33 pages (Nov. 1, 2000) English (GL002961-93).
Glory UW-100 Compact Currency Fitness Sorter brochure, 2 pages (© 1999) English (GL003027-28).
Glory Currency Fitness Sorter UW-100 Instruction Manual, 38 pages (Feb. 19, 2002) English (GL003029-66).
Glory UW-200 Multi-Purpose Company Currency Sorter brochure, 2 legal pages (© 1999) English (GL003067).
Glory Currency Sorter UW-200 With Fitness sorting mode (FIT) Instruction Manual, 44 pages (Oct. 23, 2001) English (GL003068-111).
Billcon D-202-204 brochures, 6 pages, (date uncertain, prior to Nov. 7, 2002) Japanese (G1003112-17).
Billcon® R-900 E-DS Note Counter with Dual Speed and Denomination Sorting Function brochure, 2 pages, (date uncertain, prior to Nov. 7, 2002) English (GL003167-68).
Billcon R-900DS Currency Counter Operating Manual, 6 pages, (date uncertain, prior to Nov. 7, 2002) English (GL003169-74).
Billcon R-900 Currency Counter Service Manual (601221), 31 pages, (date uncertain, prior to Nov. 7, 2002) English (GL003175-3205).
Declaration of Toshio Numata (7 pages) (Nov. 16, 2002).
AFB: AFB Currency Recognition System, 1 page (1982).
Billcon: D-202, D204 Operator's Manual, 10 pages (cover marked 611215) (Japanese).
Billcon: D-202, D204 Operator's Manual—First Translation, 14 pages.
Billcon: D-202, D204 Operator's Manual—Second Translation (Glory), 10 pages.
Billcon: D-202/204 Service Manual, 25 pages (cover marked 630229) (Japanese) (date uncertain).
Billcon: D-202/204 Service Manual—Translation, 25 pages (date uncertain).
Banking Machine Digest No. 31, 3 pages (Japanese) (date uncertain).
First Translation of Banking Machine Digest No. 31, 3 pages (last page has date of Dec. 5, 1988).
Second Translation of Banking Machine Digest No. 31 (Glory), 2 pages (first page has date of Dec. 5, 1988).
Third Translation of Banking Machine Digest No. 31, 3 pages, (Last page has date of Dec. 5, 1988).
Billcon: 38th Banking Uniform Show (1 page) and translation (2 pages ) (1998).
Billcon: D212 Note Counter, 4 pages—Japanese and Translation (date uncertain).
Billcon: D212—Odd Bill Detecting Bill Counter—Instruction Manual, 17 pages, Japanese and translation (p. 17 dated 1994).
Cummins: JetScan—Model 4060—Currency Scanner/Counter-Operator's Manual, 44 pages, (Aug. 1991).
Cummins: Sale of JetScan Currency Scanner/Counter, Model 4060, 1 page, (Aug. 1991).
Cummins: JetScan—Model 4061—Currency Scanner/Counter — Operating Instructions, 47 pages, (Apr. 20, 1993).
Cummins: Sale of JetScan Currency Scanner/Counter, Models 4061, 1page, (Apr. 20, 1993).
Cummins: JetScan—Model 4062—Currency Scanner/Counter—Operating Instructions, 53 pages, (Nov. 28, 1994).
Cummins: Sale of JetScan Currency Scanner/Counter, Models 4062, 1 page, (Nov. 28, 1994).
Cummins: Offer for Sale of Optical/Magnetic Detection, 1 page, (Sep. 1992).
Cummins: Sale of Doubles Detection, 1 page, (Aug. 1991).

Cummins: Sale of Doubles Detection, 1 page, (Jun. 1992).
Cummins: Sale of Magnetic Detection, 1 page, (Aug. 1991).
Cummins: Sale of Multiple Density Sensitivity Setting, 1 page, (Apr. 1993).
Cummins: Sale of Multiple Magnetic Sensitivity Setting, 1 page, (Apr. 1993).
Cummins: Declaration of Per Torling, 6 pages, (Mar. 18, 1999).
Cummins-*Allison Corp* v. *Glory U.S.A.*, Inc., 2 pages N.D. Ill. 1998.
Currency System International: Currency Processing System CPS 300, 4 pages, (© 1992).
Currency System International: Description of CSI CPS 600 and CPS 900 devices, 1 page (date: estimated 1994).
Currency Systems International: Medium Speed Currency Sorting Family, CPS 600 and CPS 900, 4 pages (© 1994).
Currency System International: CPS 1200, 4 pages, (© 1992).
Currency System International: Mr. W. Kranister in Conversation with Richard Haycock, 5 pages, (est. 1994).
De La Rue Systems: "The Processing of Money and Documents," 4 pages (© 1987).
De La Rue: 3100 Serie, L'Internationale des Machines a trier les Billets (© 1989) (French).
De La Rue Systems, 3100 Series Operation Instructions, 52 pages (Oct. 1986).
De La Rue Systems Currency Sorting Machines With Pattern Recognition: 3120 User Guide, 2 pages (1987).
De La Rue System Limited Use of The Diagnostics Function 3110 MK.II/3120 Machines, 20 pages (Oct. 1986) (printed Jan. 30, 2003).
De La Rue Systems U.S. Dollar Sorter: 3110 MK II International Currency Sorting machine—User Guide, 2 pages (1987).
De La Rue Systems; 2300 Series Note Counter—Making Technology Count, 4 pages, (1987).
De La Rue Systems: 2300—Operating Instruction Manual, 3 pages(© 1986).
De La Rue Systems: 2100 Banknote Counting Machine—Operator Instruction and Maintenance Sheet, 4 pages (© 1980).
De La Rue: 2700 Currency Counting Machine—User Guide, Revision 1, 53 pages, (Aug. 26, 1999).
De La Rue Systems: 2700VB brochure, 1 page, (Dec. 9, 1996).
De La Rue Systems: 9000 Series High Speed Document Reader/Sorters, 8 pages (© 1980).
G&D: CHP 50 User's Guide, 61 pages (Mar. 1998).
Glory: GFB 200/210/220/230 DeskTop Bank Note Counter brochure, 2 pages (est. before Aug. 9, 1994).
Glory: GFB-200, 210, 220 & 230 Banknote Counting Machine—Operator's Manual, 24 pages (Aug. 1994).
Glory: GFB 500/520 DeskTop Bank Note Counters brochure, 2 pages (Sep. 21, 1993).
Glory: GFB 500/520/600 Bank Note Counting Machine—Operating Instructions, 22 pages (1996).
Glory: GFB 700 Bank Note Counting Machine—Operating Instructions, 32 pages (Sep. 1998).
Glory: GFR 100 "Unstoppable" ReadMaster Currency Discriminator brochure, 2 pages (Aug. 6, 1998).
Glory: GFR 100 Currency Reader Counter—Instruction Manual, 30 pages (Aug. 15, 1995).
Glory: GFR 100 Currency Reader Counter—Instruction Manual, 32 pages (Aug. 20, 1998).
Glory: GFR 100 and GFB 700 Tank Tough Currency Discriminators brochure, 2 pages (Aug. 6, 1998).
Glory: GFR-l10 and GFR-S80 Tank Tough Currency Discriminator brochure 2 pages (Dec. 7, 1999).
Glory: GFRTl Currency Scanner, 1 page, (Dec. 1994).

Glory: GFR-X Banknote Counter with Denomination Recognition, 3 pages (est. Dec. 1994).
Glory: UF-1D brochure and translation, 2 pages (est. before Aug. 9, 1994).
Glory: UW-100 Compact Currency Fitness Sorter, 2 pages (© 1999).
Glory: UW-200 Multi-Purpose Compact Currency Sorter, 4 pages (© 1999).
Glory: GSA-500 Sortmaster brochure, 2 pages (est. Jan. 14, 1994).
Glory: GSA-500 Sortmaster brochure, 4 pages (est. Jan. 14, 1994).
Glory: GSA-500—Instruction Manual, 40 pages (prior to Jul. 1998).
Glory: GSA-500—Operating Procedures, 9 pages (prior to Jul. 1998).
Glory: Sale of Glory GSA-500 Sortmaster, 1 page (1986).
Glory: Cash Handling Systems Product Brochure, 11 pages (Apr. 25, 1994).
JCM: BC-30 Bill Counter, 2 pages (date unknown, prior to Aug. 2002).
JCM: DBC-3 U.S Dollar Bank Note Checker, 2 pages (date unknown, prior to Aug. 2002).
Mosler Toshiba: CF-400 Series Currency Sorter, 4 pages (© 1983).
MoslerToshiba: CF-400 Series Fitness Sorter, 6 pages (estimated 1989 or earlier).
Mosler/Toshiba CF-420 brochure, "Wouldn't It Be Great . . . ," 4 pages (© 1989).
Mosler: CF-420 Cash Management System—Operator's Manual, 72 pages, (© 1989).
Mosler: CF-420 Cash Management System—Operator's Manual, Chapter 5, 18 pages, (© 1989).
Mosler: CF-420 Cash Management System—Operator's Manual, Chapter 7, 15 pages, (© 1989).
Toshiba/Mosler: CF-420—Drawings of portions of Mosler CF-420 Cash Management System (Figs. A-C) and description of the same, 4 pages (1989).
Toshiba/Mosler: CF-420—Description of Toshiba/Mosler CF-420 Device, 1 page (date estimated 1989).
Mosler/Toshiba: Model CS 6600—Optical Currency Counter/Sorter, 4 pages, (© 1985).
Mosler/Toshiba: Model CS 6600—Optical Currency/Sorter, 4 pages (© 1992).
Mosler/Toshiba: Model CS-6600 Currency Handler brochure—"Let Mosler Help You Cut Costs Four Ways," 4 pages (© 1993).
Musashi Co.: New Generation-tellac-5 Series Compact Currency Counter, 2 pages (1988).
Musashi Co.: Operation Manual for Maintenance and Learning Modes for Tellac-5, 5DD, SD, DDA, A & SSD, 13 pages (prior to Aug. 2002).
Toyocom: Model NS-100—News Product News by Toyocom—"Toyocom Currency Counter Now Reads Denominations," 1 page (Sep. 26, 1994).
Toyocom: Model NS-100—Operation Guide Preliminary, 37 pages, (Jun. 13, 1995).
Japanese Reference X and Statement of Relevance, 6 pages, (date uncertain).
Geldinstitute—3 , 2 pages (1983).
Translation for Geldinstitute—3, 5 pages (1983).
DMC-688 brochure regarding DIGI Coin Counting Scales by DIGI MATEX, Inc. (2 pages) (at least as early as Jan. 21, 2002).

* cited by examiner

CURRENCY BILL AND COIN PROCESSING SYSTEM

CROSS-REFERENCE TO RELATED APPLICATION

This application claims priority to U.S. Provisional Application Serial No. 60/367,171, filed Mar. 25, 2002.

FIELD OF THE INVENTION

The present invention relates generally to the field of currency processing systems and, more particularly, to a system for processing coins and currency bills using a coin scale communicatively coupled to a currency bill processing machine.

BACKGROUND OF THE INVENTION

Generally, most currency processing machines used in banks and retail environments either process currency bills or count coins, but not both. One type of machine that does process both coins and currency bills is a redemption type of machine for exchanging bulk coins and currency bills for larger denomination currency bills. These machines can be found in a casino environment, for example. However, these are typically higher-end machines that are expensive and quite large, occupying a lot of floor space.

In other environments, including banks and casinos, the currency bills and coins are processed by two different devices. For example, a currency bill processing machine may be used to process the currency bills, while a coin processing device may be used to process the coins. Coin counters, coin sorters, and coin scales are examples of devices used to process coins. Use of a coin scale requires that the coins be sorted before using the coin scale as coin scales are capable of only processing one coin denomination at a time. Nevertheless, two separate machines are generally used to process currency bills and coins.

One drawback associated with using two separate machines—a currency bill processing device and a coin processing device—is the increased floor or counter space that accompanies the use of two separate machines. Another drawback associated with the use of two separate machines for processing currency bills and coins is that an operator processing the currency has to manually add, or at least manually enter, the totals from the coin and currency bill processing—a process that carries with it the potential for human error. Furthermore, manual entry adds to the overall time in which it takes to process the coins and currency bills. Therefore, a need exists for a small, compact, and inexpensive currency processing system that reduces the time required to process currency bills and coins.

SUMMARY OF THE INVENTION

A compact system for processing currency bills and coins comprises a compact currency bill processing device, a coin scale, and a processor communicatively linked to the currency bill processing device and the coin scale. The compact currency bill processing device counts currency bills of a plurality of denominations. The compact currency bill processing includes an evaluation unit being that is adapted to determine the denomination of each of the currency bills. The coin scale is adapted to receive at least one group of coins of a single denomination and to determine a coin total for the at least one received group corresponding to the value of the coins in the received group. The processor is adapted to receive a currency bill total from the currency bill processing device and the coin total from the coin scale and to determine an aggregate total corresponding to the sum of the received currency bill total and the coin total.

The above summary of the present invention is not intended to represent each embodiment, or every aspect, of the present invention. Additional features and benefits of the present invention will become apparent from the detailed description, figures and claims set forth below.

Figure 1:
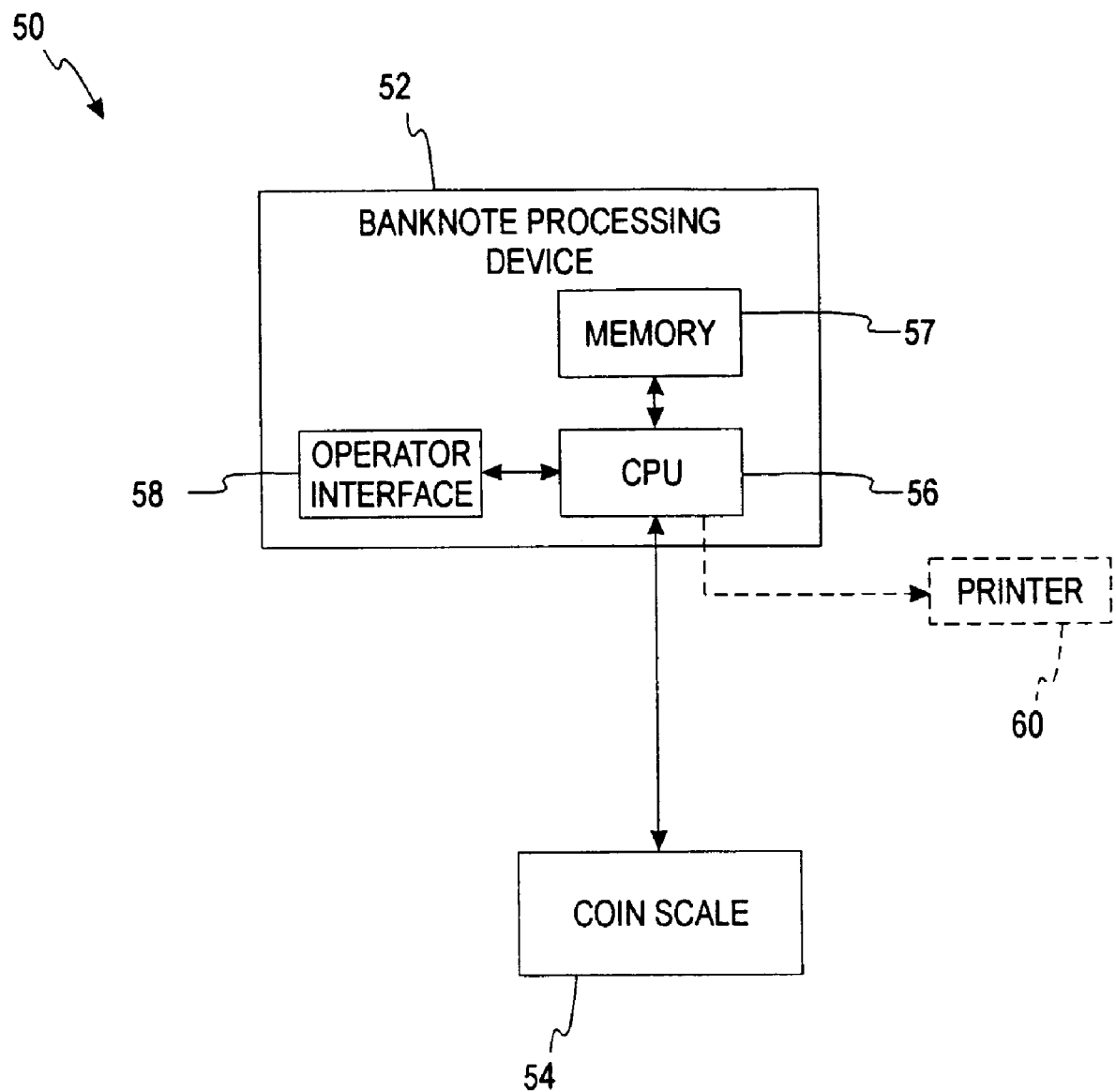
FIG. 1 is a functional block diagram of a currency bill and coin processing system according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents and alternatives falling within the spirit and scope of the invention as defined by the appended claims.

DETAILED DESCRIPTION OF THE ILLUSTRATED EMBODIMENTS

Referring now to FIG. 1, a functional block diagram of a currency bill and coin processing system 50 is shown according to one embodiment of the present invention. One use of the currency bill and coin processing system 50 is to total currency bills and coins in a batch such as, for example, a cash till drawer at a bank or a retail store. The currency bill processing system 50 includes a compact currency bill processing device 52 for counting currency bills and a coin scale 54 for counting coins. The currency bill processing device 52 and the coin scale 54 are communicatively linked for summing currency bill totals and coin totals determined by the respective devices. The currency bill processing device 52 and the coin scale 54 may be communicatively linked by way of wires or by a wireless communication system according to alternative embodiments of the currency bill and coin processing system 50. According to alternative embodiments of the present invention, the currency bill processing device 52 can denominate and authenticate currency bills in addition to counting currency bills and the coin scale 54 can "count" (calculate value from weight) bagged coins, rolled coins, coins in other containers, loose coins and currency bills as is described in further detail below.

The currency bill processing device 52 includes a processor such as a central processing unit (CPU) 56 for controlling the operation of the device 52 and the coin scale 54. The CPU 56 is linked to a memory 57 for storing information such as currency bill processing results, coin weight, and count totals as well as master authenticating characteristic information for use in authenticating currency bills, master denominating characteristic information for use in denominating currency bills, and the algorithms necessary for calculating coin and currency bills totals with the coin scale 54. In an alternative embodiment of the currency bill and coin processing system 50, the CPU 56 is an integral component of the coin scale 54, as opposed to the currency bill processing device 52. In another alternative embodiment, the currency bill and coin processing system 50 is controlled by a personal computer that is linked to the system 50.

The currency bill and coin processing system 50 includes an operator interface 58 communicatively linked to the CPU 56 for receiving input from and displaying information to an operator of the system 50. The operator interface 58 can comprise an LCD display and a keypad or a touch-screen according to alternative embodiments of the present invention. According to the embodiment of the system 50 shown in FIG. 1, the operator interface 58 is part of the currency bill processing device 52. In alternative embodiments of the currency bill and coin processing system 50, the operator interface 58 is a component of the coin scale 54, or part of an external personal computer linked to the system 50. According to another alternative embodiment, the currency bill and coins processing system is linked to an optional printer 60 for providing an operator with a hardcopy of totals and results from the processing of currency bills, coins, or bills with the system 54.

Figure 2:
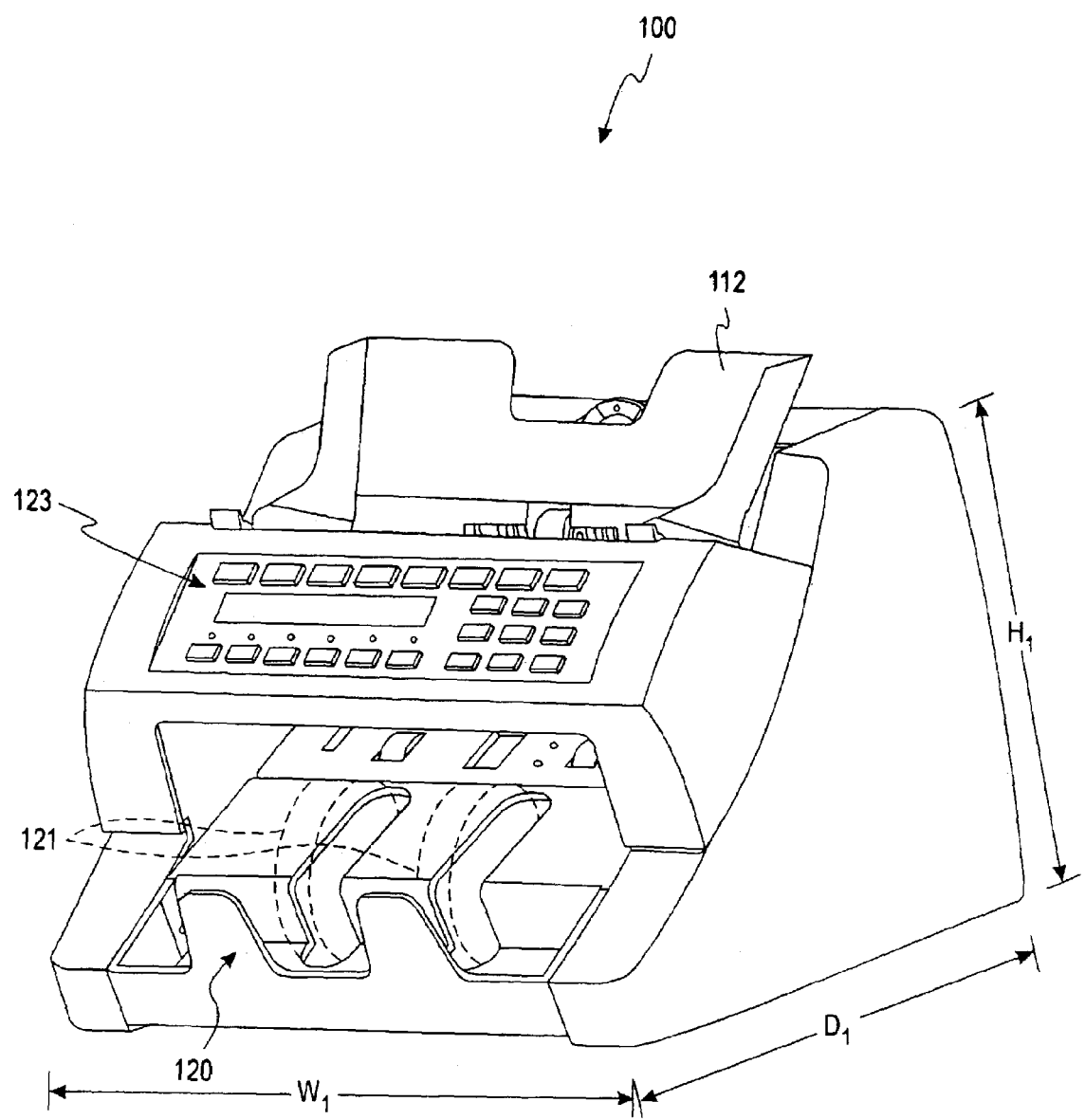
FIG. 2 is a perspective view of a single-pocket currency bill processing device for use with the currency bill and coin processing system of FIG. 1.
Figure 3:
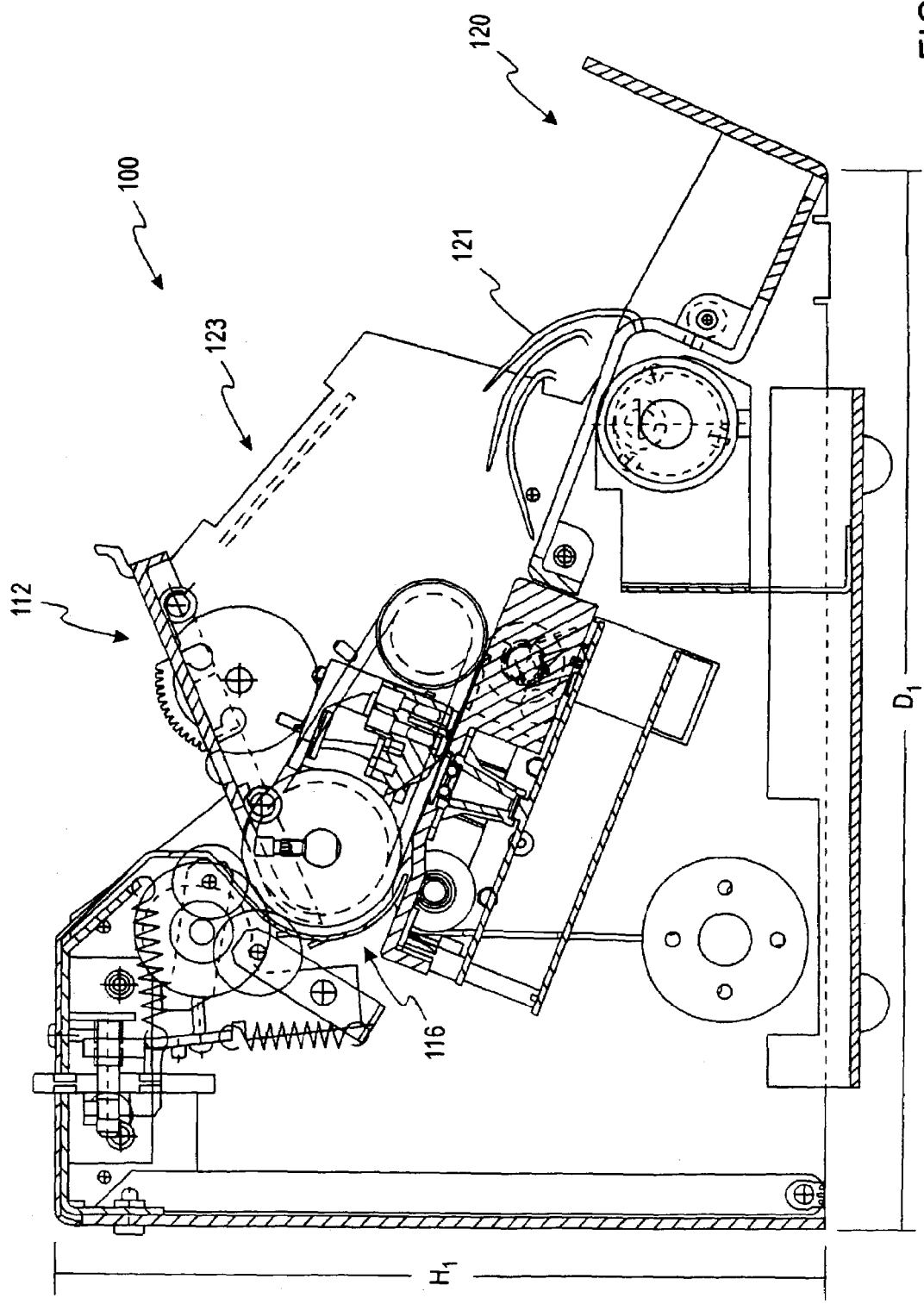
FIG. 3 is a cross-sectional view of the single-pocket device of FIG. 2.
Figure 4:
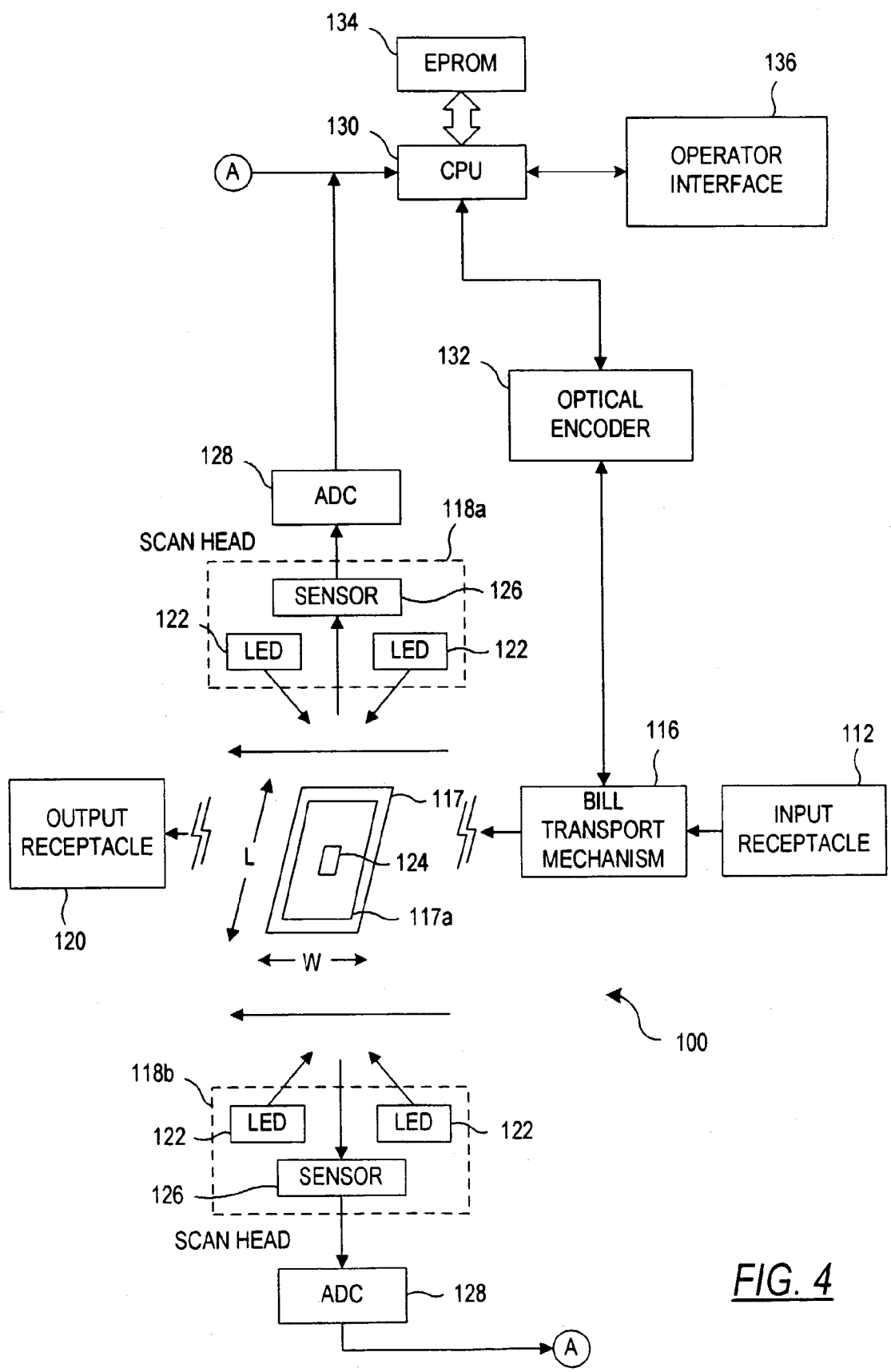
FIG. 4 is a functional block diagram of the single-pocket device of FIG. 2.

Referring now to FIGS. 2–4, a currency bill processing device 100 having a single output receptacle ("single-pocket device") for use with one embodiment of the currency bill and coin processing system 50 will be described. The single-pocket device 100 includes an input receptacle 112 for receiving a stack of currency bills to be processed. Currency bills stacked in the input receptacle 112 are picked out or separated, one at a time, and sequentially transported by a currency bill transport mechanism 116, between a pair of scanheads 118a and 118b where, for example, the currency denomination of the currency bill is scanned and identified. In the embodiment depicted, each scanhead 118a,b is an optical scanhead that scans for characteristic information from a currency bill 117 which is used to identify the denomination of the currency bill. The scanned currency bill 117 is then transported to an output receptacle 120, which may include a pair of stacking wheels 121, where currency bills so processed are stacked for subsequent removal.

The single-pocket device 100 includes an operator interface 123, which is shown in FIG. 2, for communicating with an operator of the single-pocket device 100. The interface 123 can function as the operator interface 52 (FIG. 1) of the currency bill and coin processing system 50. The interface 123 receives input from and displays information to an operator of the currency bill and coin processing system 50. Input data may comprise, for example, operator-selected operating modes and operator-defined operating parameters for the currency bill and coin processing system 50. Output data displayed to the operator may comprise, for example, a selection of operating modes and/or information relevant to the status of currency bills being processed by the single-pocket device 100. In one embodiment, the interface 123 comprises a touch-screen which may be used to provide input data and display output data related to the operation of the currency bill and coin processing system 50. Alternatively, the interface 123 may employ physical keys or buttons and a separate display or a combination of physical keys and displayed touch-screen keys.

In alternative embodiments of the present invention, additional sensors can replace or be used in conjunction with the optical scanheads 118a,b in the single-pocket device 100 to analyze, authenticate, denominate, count, and/or otherwise process currency bills. For example, size detection sensors, magnetic sensors, thread sensors and/or ultraviolet/fluorescent light sensors may be used in the single-pocket device 100 to evaluate currency bills. The use of these types of sensors for currency evaluation are described in commonly owned U.S. Pat. No. 6,278,795, which is incorporated herein by reference in its entirety.

According to one embodiment of the single-pocket device 100, each optical scanhead 118a,b comprises a pair of light sources 122 that direct light onto the currency bill transport path so as to illuminate a substantially rectangular light strip 124 upon a currency bill 117 positioned on the transport path adjacent the scanhead 118. Light reflected off the illuminated strip 124 is sensed by a photodetector 126 positioned between the two light sources. The analog output of the photodetector 126 is converted into a digital signal by means of an analog-to-digital (ADC) convertor unit 128 whose output is fed as a digital input to a processor such as the CPU 102.

According to one embodiment, the currency bill transport path is defined in such a way that the transport mechanism 116 moves currency bills with the narrow dimension of the currency bills being parallel to the transport path and the scan direction. Put another way, the wide edge of a currency bill is the leading edge of the currency bill. As a currency bill 117 traverses the scanheads 118a,b, the light strip 124 effectively scans the currency bill across the narrow dimension of the currency bill. In the embodiment depicted, the transport path is so arranged that a currency bill 117 is scanned across a central section of the currency bill along its narrow dimension, as shown in FIG. 4. Each scanhead functions to detect light reflected from the currency bill as it moves across the illuminated light strip 124 and to provide an analog representation of the variation in reflected light, which, in turn, represents the variation in the dark and light content of the printed pattern or indicia on the surface of the currency bill. This variation in light reflected from the narrow dimension scanning of the currency bills serves as a measure for distinguishing, with a high degree of confidence, among a plurality of currency denominations which the system is programmed to handle.

Additional details of the mechanical and operational aspects of the single-pocket device 50 are described in detail in U.S. Pat. Nos. 5,295,196 and 5,815,592 each of which is incorporated herein by reference in its entirety. According to various alternative embodiments, the currency processing device 100 is capable of processing, including denominating, currency bills at a rate ranging between about 800 to over about 1500 currency bills per minute.

While the single-pocket device 100 of FIGS. 2–4 has been described as a device capable of determining the denomination of processed currency bills, the currency bill and coin processing system 50 utilizes note counting devices ("note counters") according to alternative embodiments of the present invention. Note counting devices differ from currency bill denominating devices in that note counters do not denominate the currency bills being processed and are not designed to process and determine the total value of a stack of mixed denomination currency bills. Note counters are disclosed in commonly owned U.S. Pat. Nos. 6,026,175; 6,012,565; and 6,493,461; each of which is incorporated herein by reference in its entirety.

The single-pocket device 100 described above in connection with FIGS. 2–4, is small and compact, such that it may be rested upon a tabletop, desktop or countertop. According to one embodiment, the single-pocket device 100 has a height $H_1$ of about 9.5 inches (about 24.13 cm), width $W_1$ of about 11 inches (about 27.94 cm), a depth $D_1$ of about 12 inches (about 30.48 cm), and a weight ranging from 15–20 pounds. In this embodiment, therefore, the single-pocket device 100 has a "footprint" of about 11 inches by 12 inches (27.94 cm by 30.48 cm) or approximately 132 square inches (about 851.61 cm$^2$) which is less than one square foot, and a volume of approximately 1254 cubic inches (about 20,549.4 cm$^3$) which is less than one cubic foot. According to alternative embodiments, the single-pocket device 100 has a height $H_1$ ranging from 7 inches to 12 inches, a width $W_1$ ranging from 8 inches to 15 inches, a depth $D_1$ ranging from 10 inches to 15 inches, and a weight ranging from about 10 to about 30 pounds, which results in a footprint ranging from about 80 in$^2$ to about 225 in$^2$.

In alternative embodiments of the currency bill and coin processing system 50, currency bill processing devices having a plurality of output receptacles ("multi-pocket devices") are used in place of the single-pocket device 100. Multi-pocket devices having two, three, four and six pockets are described in detail in the commonly owned U.S. Pat. No. 6,256,407 B1, which is incorporated herein by reference in its entirety, and these various multi-pocket embodiments may be employed in the currency bill and coin processing system 50.

Figure 5:
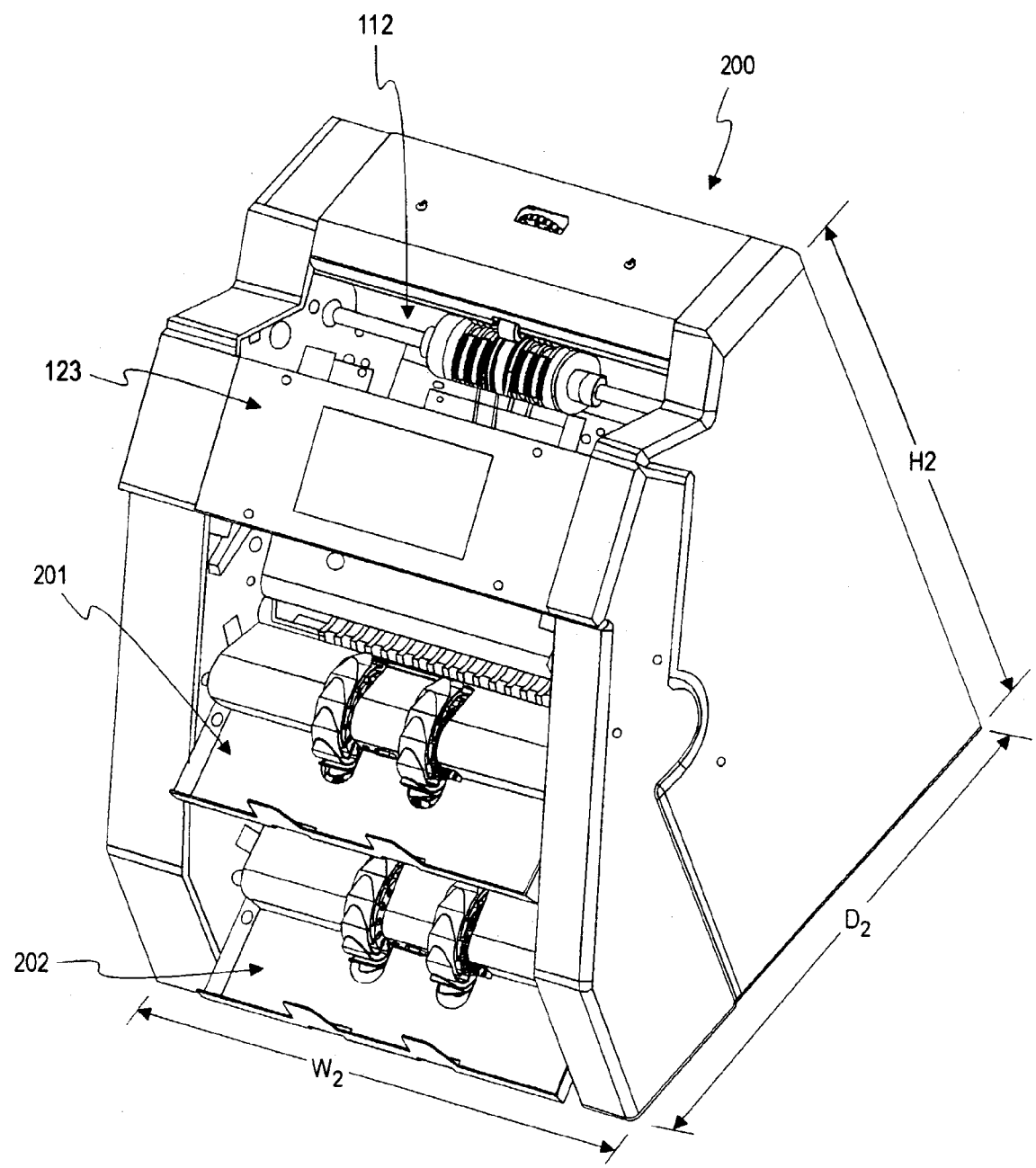
FIG. 5 is a perspective view of a two-pocket currency bill processing device for use with the currency bill and coin processing system of FIG. 1 according to an alternative embodiment of the present invention.
Figure 6:
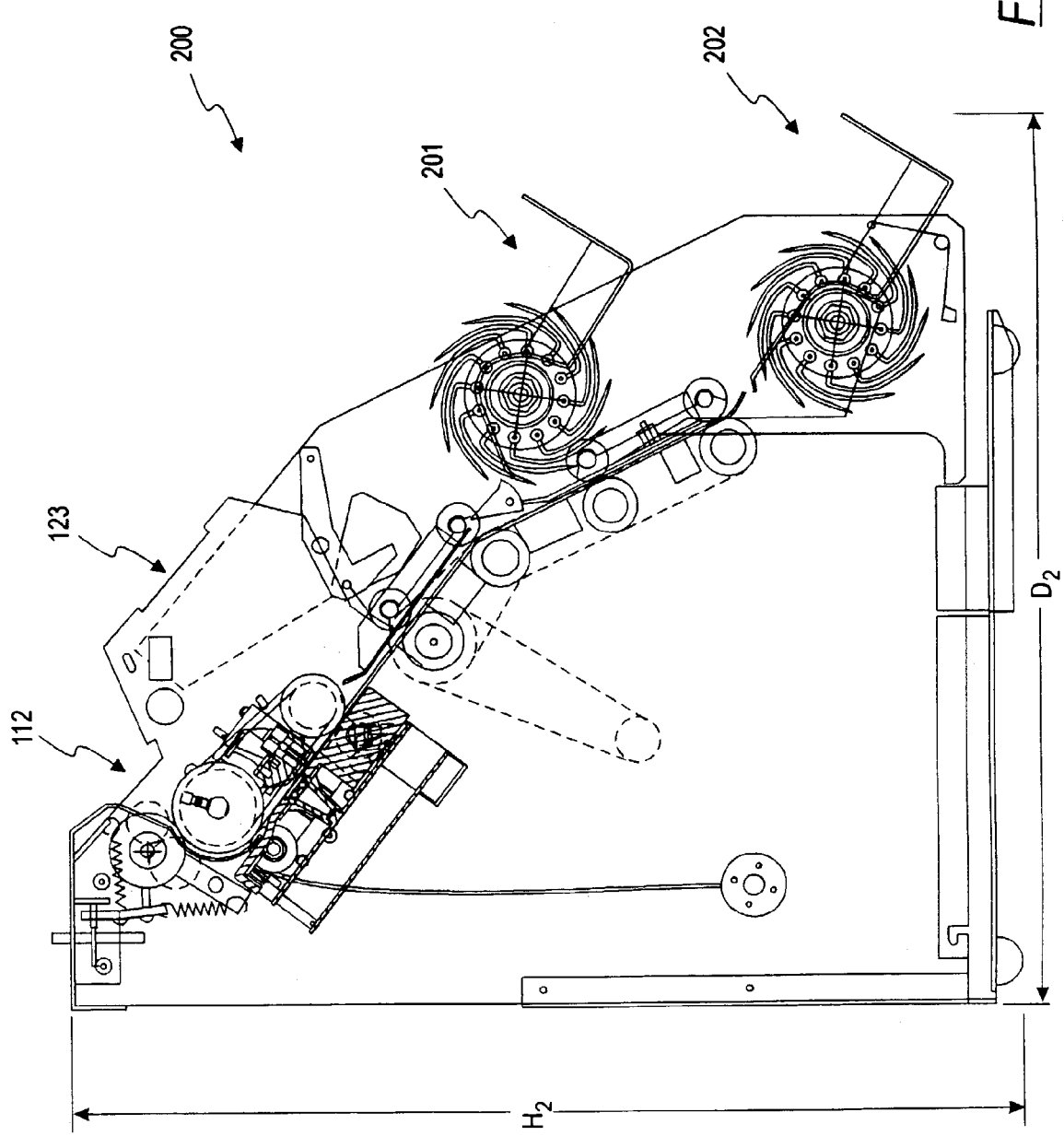
FIG. 6 is a cross-sectional view of the two-pocket currency bill processing device of FIG. 3.

Referring now to FIGS. 5 and 6, a currency bill processing device 200 having two output receptacles 201, 202 ("two-pocket device") is shown. The two-pocket device 200 can be used as the currency bill processing device 52 (FIG. 1) according to an alternative embodiment of the currency bill and coin processing system 50. The two-pocket device 200 includes an input receptacle 112 (similar to that shown in FIG. 2) and an operator interface 123 (similar to that shown in FIG. 2) for communicating with an operator of the two-pocket device 200. Generally, the two-pocket device 200 operates in a manner similar to that of the single-pocket device 100 (FIGS. 2–4), except that the transport mechanism of the two-pocket device 200 is adapted to transport the currency bills to either of the two output receptacles 201, 202. The two output receptacles 201, 202 may be utilized in a variety of fashions according to a particular application. For example, currency bills may be directed to the first output receptacle 201 until a predetermined number of currency bills have been transported to the first output receptacle 201 (e.g., until the first output receptacle 201 reaches its capacity or a strap limit) and then directs subsequent currency bills to the second output receptacle 202. In another application, all currency bills are transported to the first output receptacle 201 expect those currency bills triggering error signals, such as "no call" error signals (i.e., currency bill whose denomination is not identified) and "suspect document" error signals (i.e., currency bills failing an authentication test), which are directed to the second output receptacle 202. Further details of the operational and mechanical aspects of the two-pocket device 200 illustrated in FIG. 5 are detailed in commonly owned U.S. Pat. Nos. 5,966,456; 6,278,795 B1; and 6,311,819 B1, each of which is incorporated herein by reference.

The two-pocket device 200 of FIGS. 5 and 6 is small and compact which allows the device 200 to be conveniently place on a table-top. According to one embodiment, the two-pocket device 200 has a height $H_2$ of about 17.5 inches (about 44.45 cm), a width $W_2$ of about 13.5 inches (about 34.29), a depth $D_2$ of about 15 inches (about 38.1 cm), and weighs approximately 35 pounds (about 15.9 kg). Accordingly, the two-pocket device 200 has a footprint of about 230 square inches (1406 cm$^2$) or about 1.5 square feet and a volume of about 4190 cubic inches (about 58,051 cm$^3$) or slightly more than 2.3 cubic feet.

One of the contributing factors to the size of the two-pocket device 200, as well as the single-pocket device 100 (FIGS. 2–4) and other multi-pocket devices, is the size of the currency bills to be handled. For example, some German Deutschmark notes are larger than U.S. currency bills. Therefore, if an application requires that a currency bill processing device be able to process both U.S. and German notes, the transport mechanism of the device must be adapted to handle both sizes of notes. Accordingly, the size of the currency bill processing device can vary according to alternative embodiments of the present invention. According to an alternative embodiments, the two-pocket device 200 has a height $H_2$ ranging from 15–20 inches, a width $W_2$ ranging from 10–15 inches, a depth $D_2$ ranging from 15–20 inches, and a weight ranging from about 35–50 pounds. Therefore, the two-pocket device 200 has a footprint ranging from 10–15 inches by 15–20 inches—about 150 in$^2$ to about 300 in$^2$—and a volume of about 2250–6000 in$^3$.

Figure 7:
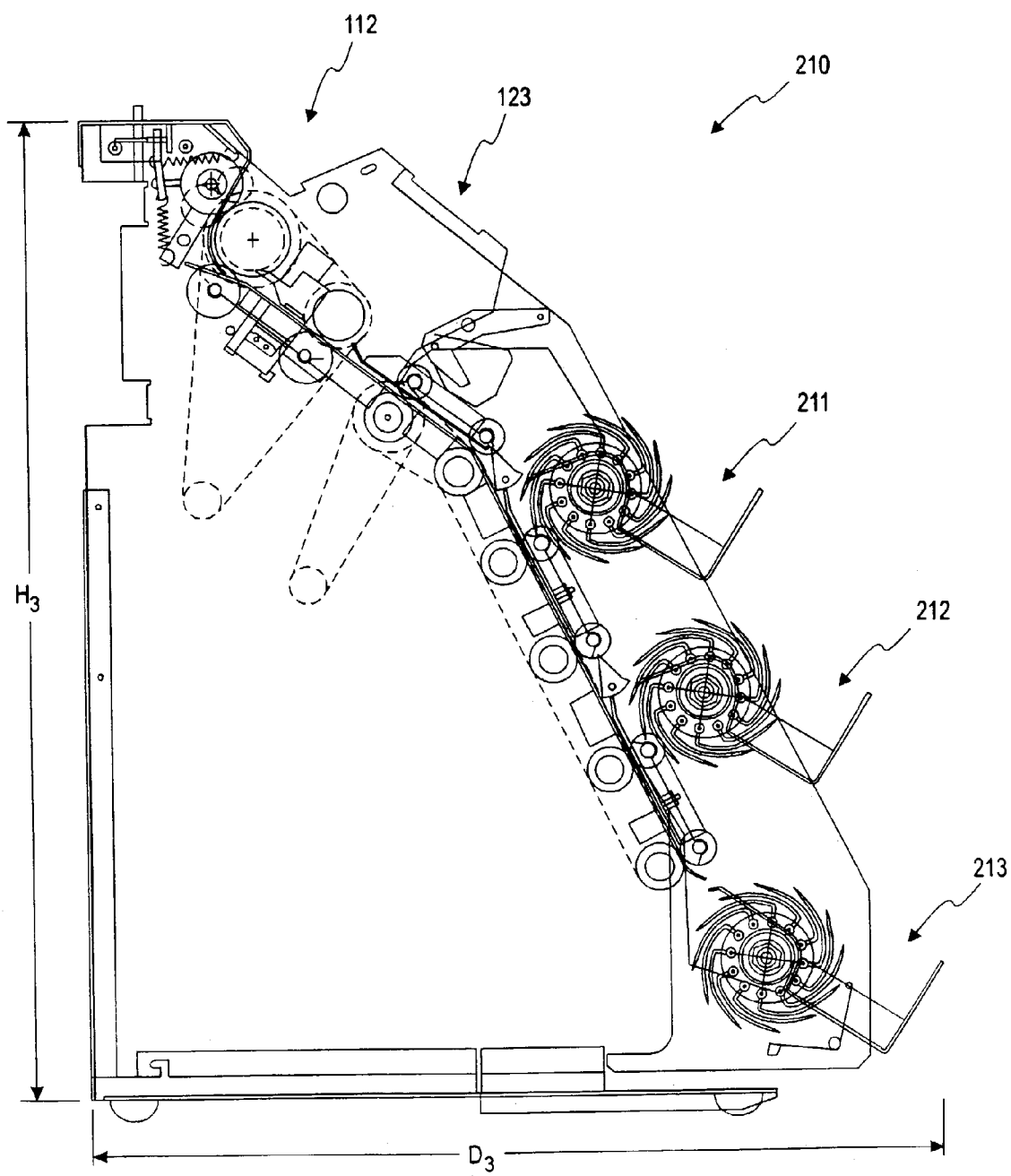
FIG. 7 is a cross-sectional view of a three-pocket currency bill processing device for use with the currency bill and coin processing system of FIG. 1 according to another alternative embodiment of the present invention.

Referring to FIG. 7, a currency bill processing device 210 having three output receptacles 211–213 ("three-pocket device 210") is shown. The three-pocket device 210 can be used as the currency bill processing device 52 (FIG. 1) in an alternative embodiment of the currency bill and coin processing system 50. Again, as with the other multi-pocket devices described and to be described herein, the three-pocket device 210 generally operates in a similar manner to the single-pocket device 100 except that the transport mechanism of the three-pocket device 210 is adapted to transport the currency bills to three different output receptacles 211–213. Multiple output receptacles 211–213 provide an increased number of currency bill processing options to an operator of a currency bill processing device 52. Briefly, for example, an operator can sort more denominations of currency bills as more output receptacles are provided.

According to one embodiment of the present invention, the three-pocket device 210 has a width $W_3$ ranging from 10–15 inches, a height $H_3$ ranging from 20–25 inches, and a depth $D_3$ ranging from 15–25 inches, which results in a footprint ranging between about 150 in$^2$ and about 375 in$^2$. Further details of the three-pocket device 300 are described in U.S. Pat. No. 6,256,407 B1, which is incorporated by reference above.

Figure 8:
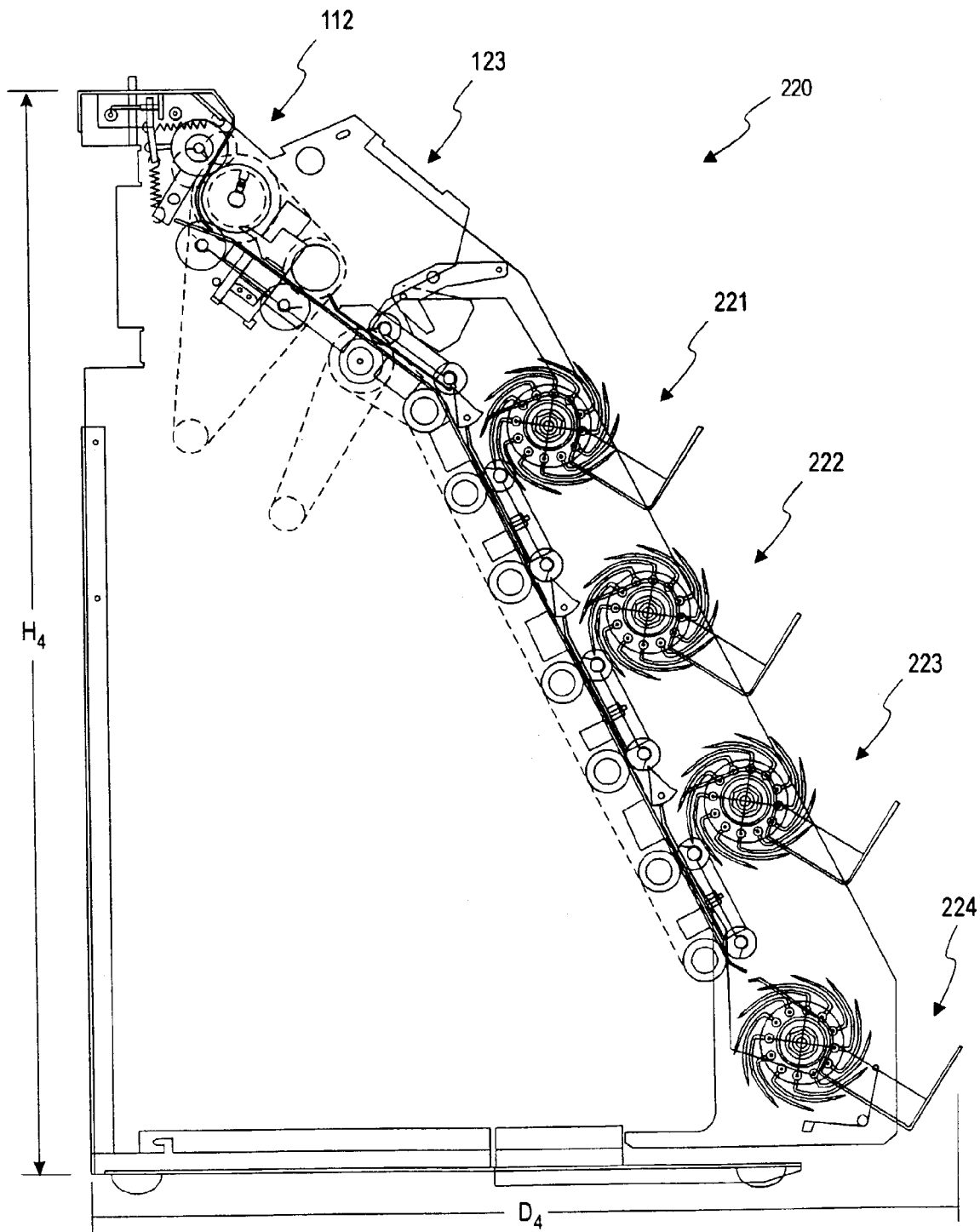
FIG. 8 is a cross-sectional view of a four-pocket currency processing device for use with the currency bill and coin processing system of FIG. 1 according to another alternative embodiment of the present invention.

Referring to FIG. 8, a currency bill processing device 220 having four output receptacles 221–224 ("four-pocket device") is shown. The four-pocket device 220 can be used as the currency bill processing device 52 (FIG. 1) in an alternative embodiment of the currency bill and coin processing system 50. According to one embodiment of present invention, the four-pocket device 220 has a width $W_4$ ranging from 10–15 inches, a height $H_4$ ranging from 25–30 inches and a depth $D_4$ ranging from 20–25 inches, which results in a footprint ranging between about 200 in$^2$ and about 375 in$^2$. Further details of the four-pocket device 220 are described in U.S. Pat. No. 6,256,407 B1, which is incorporated by reference above.

Figure 9:
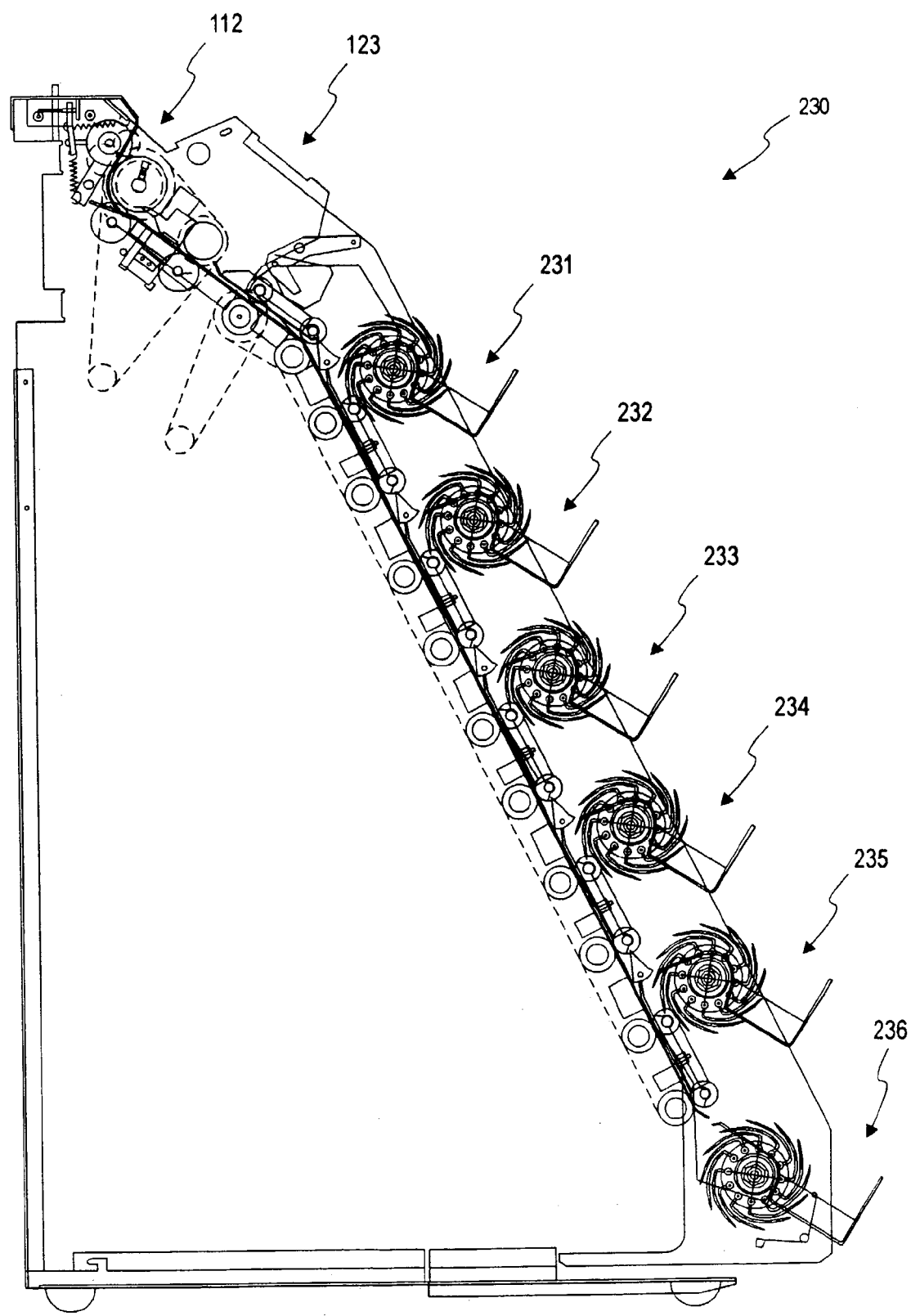
FIG. 9 is a cross-sectional view of a six-pocket currency processing device for use with the currency bill and coin processing system of FIG. 1 according to another alternative embodiment of the present invention.

Referring to FIG. 9, a currency bill processing device 230 having six output receptacles 231–236 ("six-pocket device") is shown. The six-pocket device 230 can be used as the currency bill processing device 52 (FIG. 1) in an alternative embodiment of the currency bill and coin processing system 50. According to one embodiment of present invention, the six-pocket device 230 has a width $W_6$ ranging from 10–15 inches, a height $H_6$ ranging from 35–45 inches and a depth $D_6$ ranging from 22–32 inches, which results in a footprint ranging between about 222 in$^2$ and 480 in$^2$. Further details of the six-pocket device 230 are described in U.S. Pat. No. 6,256,407 B1, incorporated by reference above.

According to one alternative embodiment of the present invention, the multi-pocket devices 210, 220, 230 are constructed with generally the same footprint as the two-pocket device 200 (e.g., ranging between about 150 in$^2$ to about 300 in$^2$). Accordingly, these multi-pocket devices 210, 220, 230 are small and compact allowing them to be rested upon a tabletop or countertop. Generally, the multi-pocket devices 210, 220, 230 increase in height as more output receptacles are added.

Figure 10:
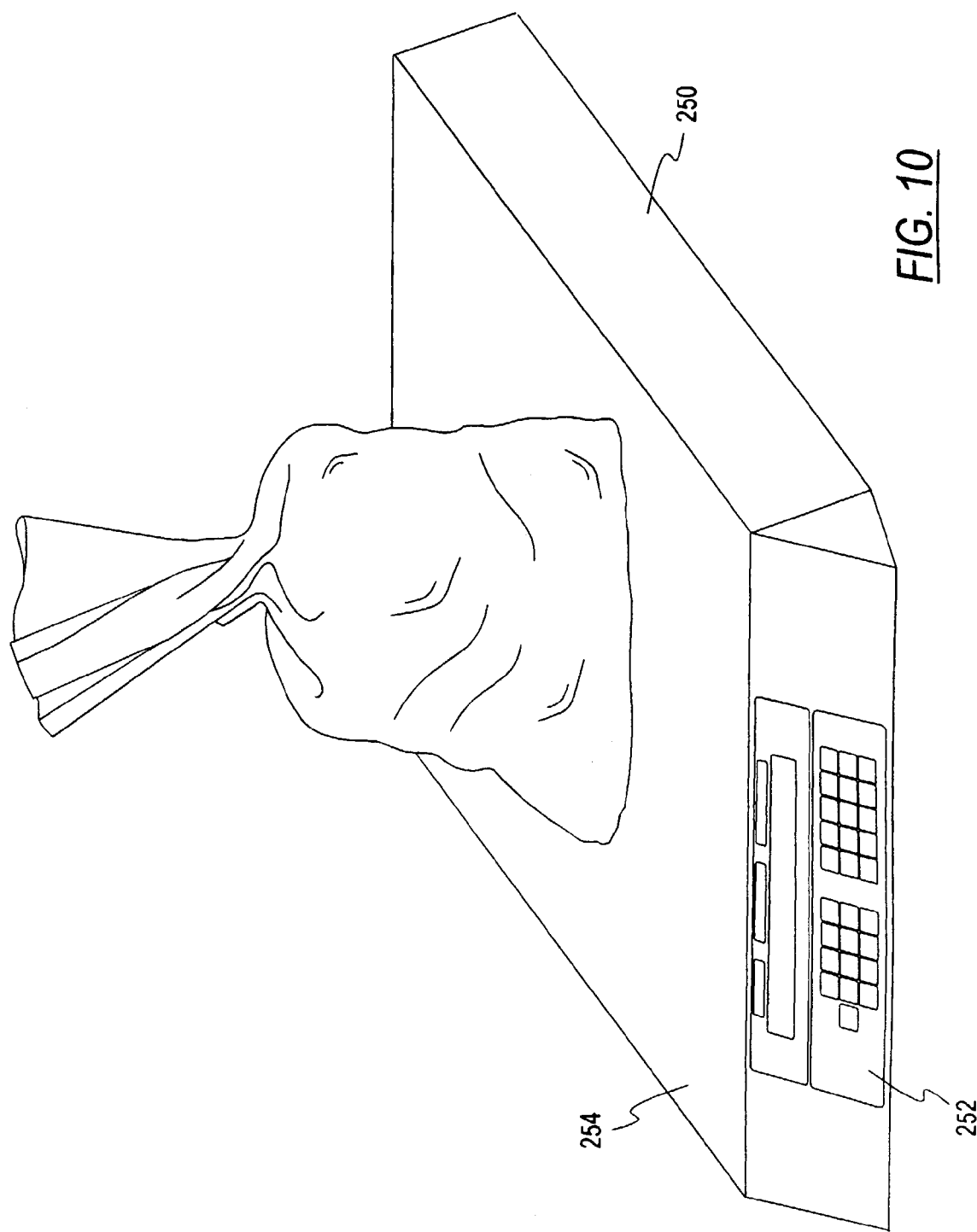
FIG. 10 is a perspective view of a coin scale, shown weighing bagged coins, for use with the currency bill and coin processing system of FIG. 1 according to one embodiment of the present invention.
Figure 11:
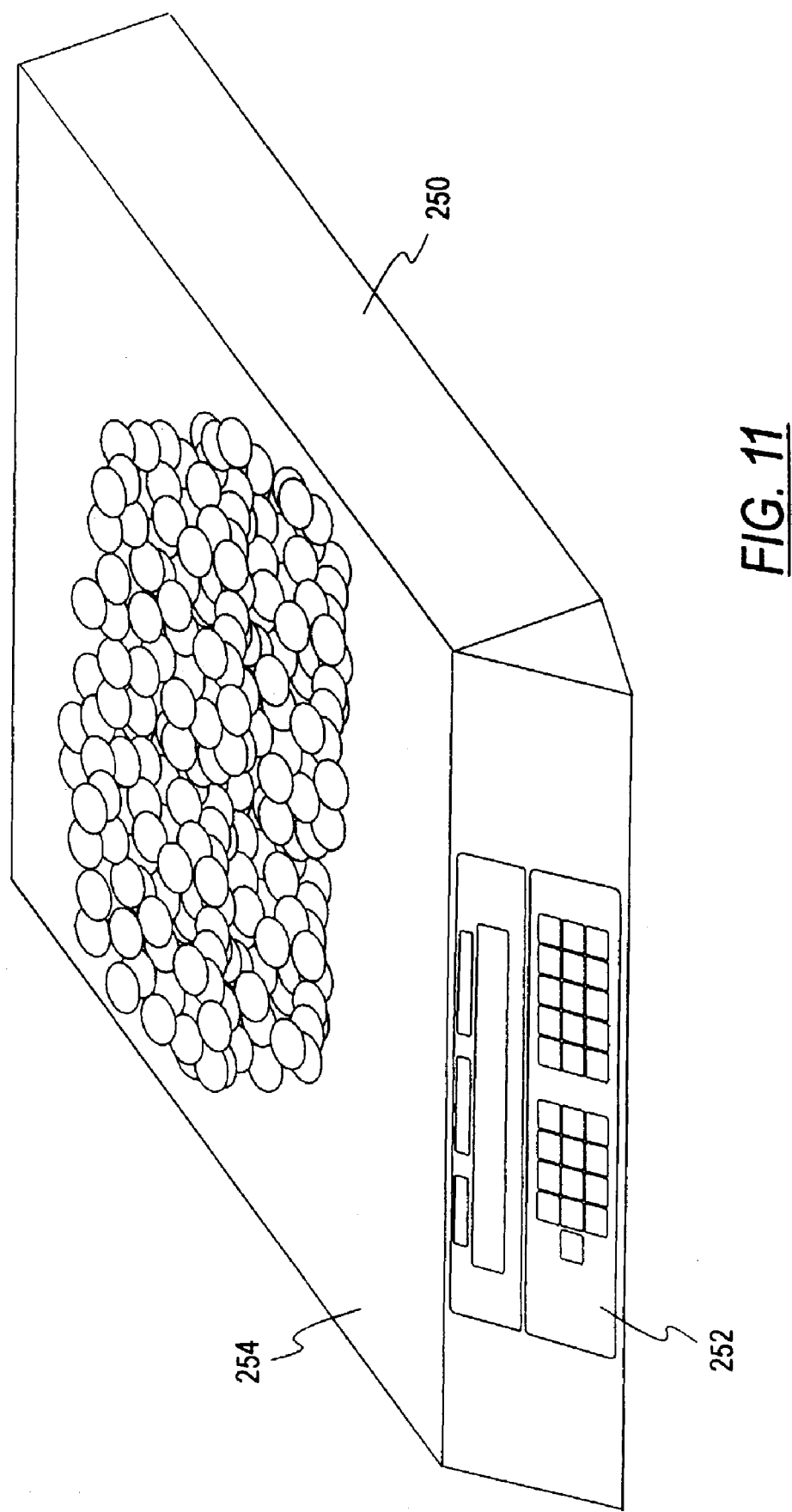
FIG. 11 is a perspective view of a coin scale, shown weighing loose coins, for use with the currency bill and coin processing system of FIG. 1 according to one alternative embodiment of the present invention.

Referring now to FIGS. 10 and 11, a coin scale 250 is shown having a bag of coins disposed thereon and a batch of loose coin disposed thereon, respectively. The coin scale 250 can be used as the coin scale 54 according to one embodiment of the currency bill and coin processing system 50. The coins scale 250 weighs coins of a single denomination and then calculates the total value of the weighed coins based on the weight of the coins. The coin scale 250 has a compact size allowing it to be used on a tabletop or desktop.

According to the illustrated embodiment, the coin scale 250 includes an operator interface 252 having an LCD display for displaying information to an operator and a keypad for receiving input from an operator. According to an alternative embodiment of the currency bill and coin processing system 50, the coin scale 54 does not have an operator interface; rather, the coin scale 54 utilizes the operator interface 58 (FIG. 1) of the currency bill and coin processing system 50. In order to determine the value of coins processed, the operator interface of the coin scale 250 receives input from the operator indicative of the denomination of coins about to be weighed because the coin scale is only able to processes a single denomination of coins at a time according to one embodiment of the present invention. According to one embodiment, a plurality of denomination specific algorithms are stored in a memory of the coin scale 250, or the memory 57 of the system 50, for calculating the aggregate value of coins based upon the weight of the coins. For example, an operator desiring to determine the aggregate dollar amount of a plurality of quarters, places the quarters in a tray 254 of the coin scale 250 and inputs via the operator interface 58 that quarters are to be processed and the coin scale 250 then determines the aggregate dollar amount of the quarters based upon their weight and then displays that amount to the operator via the operator interface. The coins placed in the tray 254 of the coin scale 250 for processing can comprise bagged coins as shown in FIG. 10, loose coins as shown in FIG. 11, rolled coins (not shown), coin in a container(s) or a combination thereof. In addition to government issued coins, the coin scale 250 can be programmed to weigh and process other types of "coins" including casino tokens, transit tokens, and other types of tokens.

According to another embodiment, it is unnecessary for the operator to input the coin denomination to be weighed to the coin scale 250; rather, the coin scale 250 automatically prompts the operator to weigh coins of a specific denomination and sequentially prompts the operator to weigh another specific coin denomination after the previous denomination has been weighed as the coin scale 250 checks through a list of coin denomination stored in a memory. For example, upon activation, the coin scale 250 instructs the operator, via the operator interface 252, that pennies are to be placed on the tray 254 and weighed. The penny total is determined and is added to a running total. After the penny total is determined, the coin scale indicates to the operator to place nickels on the coin tray 254. If there are no nickels to be weighed, the operator can indicate so via the operator interface 252 by pressing a continue button, for example. After each coin denomination is weighed, the coin scale 250 prompts the operator to weigh the next coin denomination until the predetermined list (e.g., the coins in the U.S. coin set) is exhausted. The coin scale 250 checks through the list in a logical sequence (e.g., in increasing or decreasing order of denomination value) or in a different preprogrammed manner.

According to an alternative embodiment of the present invention, the coin scale 250 is capable of determining a total dollar amount of a batch of rolled coins of mixed denominations. For example, according to such an embodiment, the coin scale 250 can determined that a roll of quarters (typically having forty quarters) and a roll of dimes (typically having fifty dimes) both placed on the tray 254 has a collective value of fifteen dollars.

According to one embodiment, when counting loose coins of several denominations with the coin scale 250, each coin denomination is processed by itself so it is first necessary to segregate the coins by denomination. Often, in the retail or banking environment, coins are already segregated according to denomination in a cash till drawer. The operator must input the denomination of other coins to be processed via the operator interface 252, or allow the coin scale to advance to subsequent denominations according to a preprogrammed sequence of coin denominations. As each coin denomination is counted, the determined total corresponding to each denomination is stored in a memory of the coin scale 250 or a memory of the currency bill and coin processing system 50. The totals are then summed after all coin denominations have been counted. Alternatively, a running total is maintained as the different coin denominations are being processed. Piece counts of each denomination may also be determined and maintained in the memory.

According to one embodiment of the currency bill and coin processing system present invention, the coin scale 54 (or scale 250 shown in FIGS. 10–11) includes a "zeroing option" which resets the weight on the scale account for the weight of a container into which loose coins are placed. Put another way, the zeroing option accounts for the tare weight. For example, a dish may be placed on the tray 254 and then a zeroing button on an operator interface is depressed which sets the scale back to zero so that the weight of the dish is not included in the weight of coins to be placed in the dish.

According to alternative embodiments of the present invention, the coin scale 250 is capable of weighing and processing loose currency or strapped, banded, bundled or clipped stacks of currency. The coin scale 250 weighs the currency and determines a corresponding a dollar amount. In addition to government issued currency, the coin scale 250 can be programmed to weigh and processes other types of "currency" including casino script, bar coded tickets, coupons, food stamps, postage stamp, etc.

According to one embodiment, the coin scale 250 for use in the currency bill and coin processing system 50 is a compact device allowing it to be rested on a table top. A coin scale that can be used in one embodiment of the currency bill and coin processing system 50 is commercially available from Digi Matex, Inc. (Model No. DMC-688). An example of another coin scale for use with an alternative embodiment of the present invention is the TellerMate which is made by Percell Group PLC.

Figure 12:
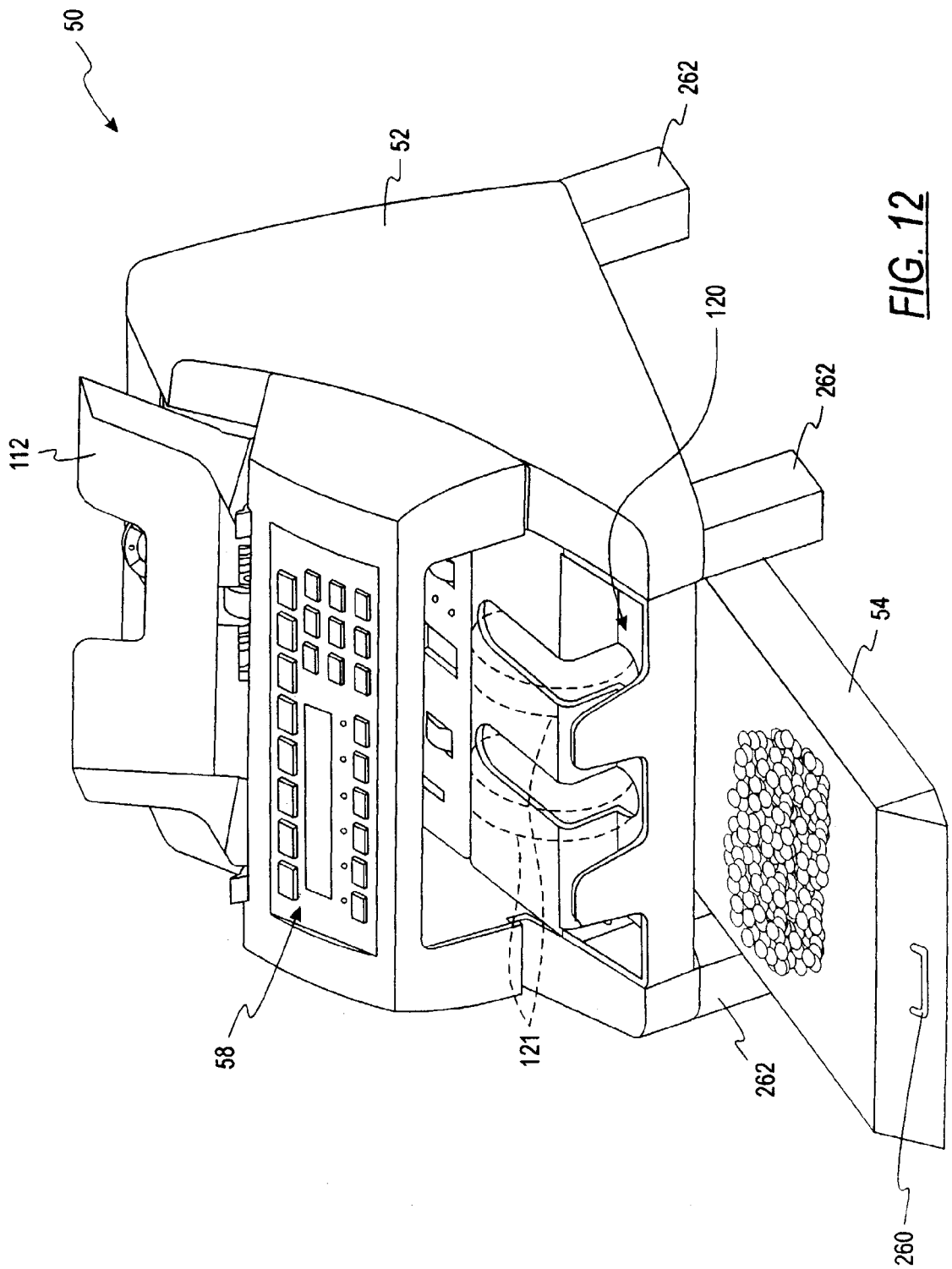
FIG. 12 is a perspective view of a currency bill and coin processing system according to one embodiment of the present invention.
Figure 13:
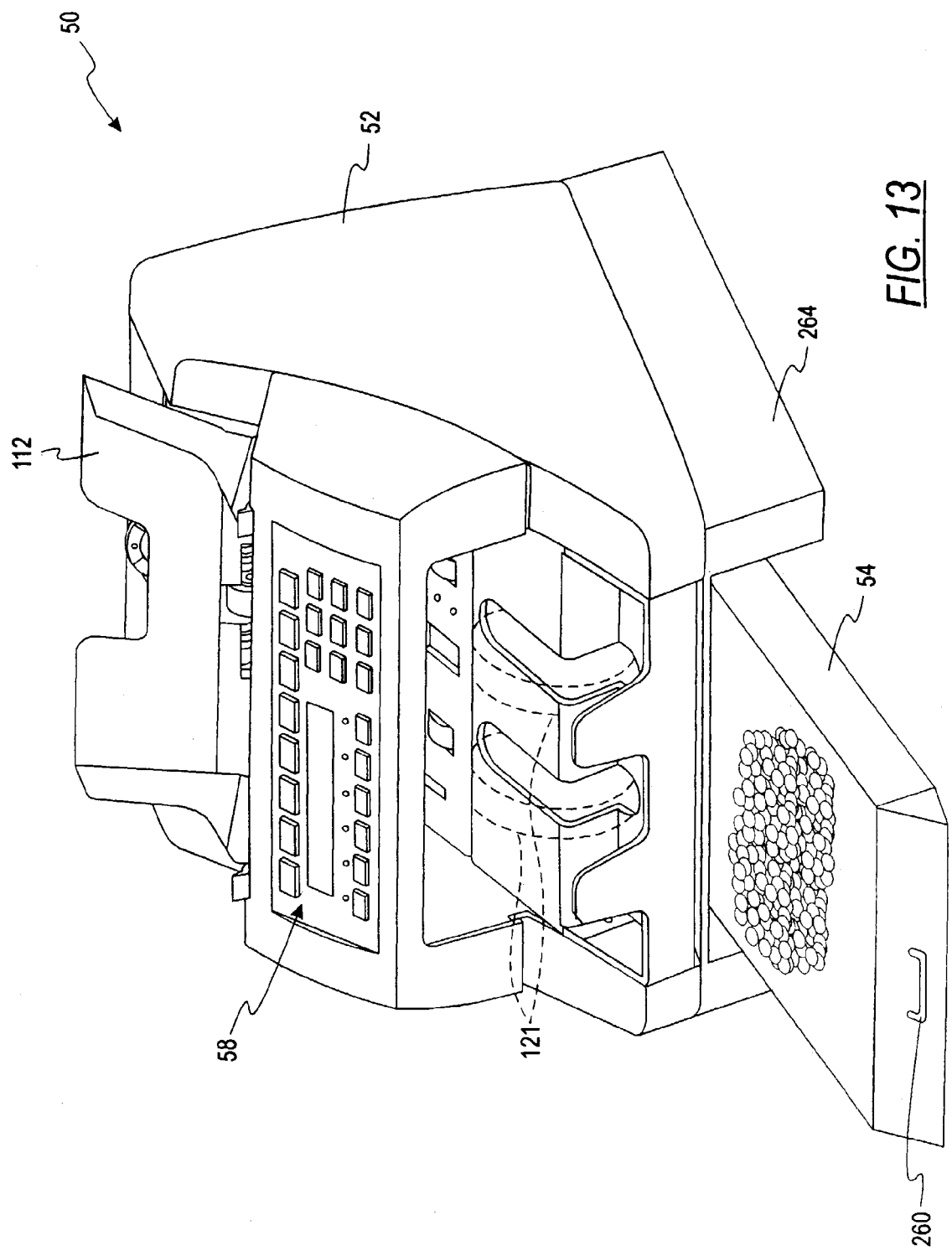
FIG. 13 is a perspective of a currency bill and coin processing system according to an alternative embodiment of the present invention.

Referring now to FIGS. 12 and 13, the currency bill and coin processing system 50 is shown according to one embodiment of the present invention wherein the coin scale 54 is disposed below the single-pocket currency bill processing device 52. The coin scale 52 is shown in an operating position extending out from beneath the single-pocket device 52. When not in use, the coin scale 54 is moved (backward into the page as shown in FIG. 12) to a storage position wherein the coin scale 54 is disposed substantially below the single-pocket device 52. According to one embodiment, the footprint of the currency bill and coin processing system 50 is substantially the same as the single-pocket device 52 when the coin scale 54 is in the storage position. According to one embodiment of the currency bill and coin processing system 50, a handle 260 is connected to the coin scale 54 to assist the operator of the system 50 in moving the coin scale 54 between the storage and operating positions. According to an alternative embodiment, the coin scale 54 is coupled to rails (not shown) or is disposed on a slideable shelf or drawer (not shown) to facilitate the movement of the coin scale 54 between the operating and storage positions.

According to the embodiment of the currency bill and coin processing system 50 shown in FIGS. 12 and 13, the system 50 includes an operator interface 58 for receiving operational instructions from an operator of the system 50 and for displaying information to the operator. The currency bill processing device 52 and the coin scale 54 are communicatively linked together allowing the interface 58 to receive and display information relevant to the coin scale 54 and to allow coin totals to be sent to a CPU 56 (FIG. 1) disposed within the currency bill processing device 52.

In the embodiment of the currency bill and coin processing system 50 illustrated in FIG. 12, the single-pocket device 52 is disposed on a plurality of legs 262, which have a height sufficient to allow the coin scale 54 move to the storage position below the single-pocket device 52. In an alternative embodiment of the currency bill and coin processing system 50 of the present invention, the currency bill processing device 52 is disposed on a different type of structure such as a platform 264 as is shown in FIG. 13. The platform 264 has a height and width sufficient to accommodate the coin scale 54 when in the storage position beneath the currency bill processing device 52. Alternatively still, the currency bill processing device 52 may be disposed on a desktop and the coin scale is disposed within a drawer of the desk. Alternatively still, regardless of how the currency bill processing device 52 is supported, the currency bill processing device 52 and the coin scale 54 are arranged such that when the coin scale 54 is in the storage position beneath the currency bill processing device 52, the footprint of the currency bill and coin processing system 50 is substantially equivalent to the currency bill processing device 52 so that the system is compact allowing it to be used on a tabletop. Accordingly, where the currency bill processing device 52 is a single-pocket device 100, the footprint of the currency bill and coin processing system 50 is less than about 0.6 ft$^2$ according to one embodiment of the system 50. In an alternative embodiment, the currency bill and coin processing system 50 has a footprint less than about 1.6 ft$^2$. Alternatively still, the system 50 has a footprint less than about 1.5 ft$^2$.

Figure 14:
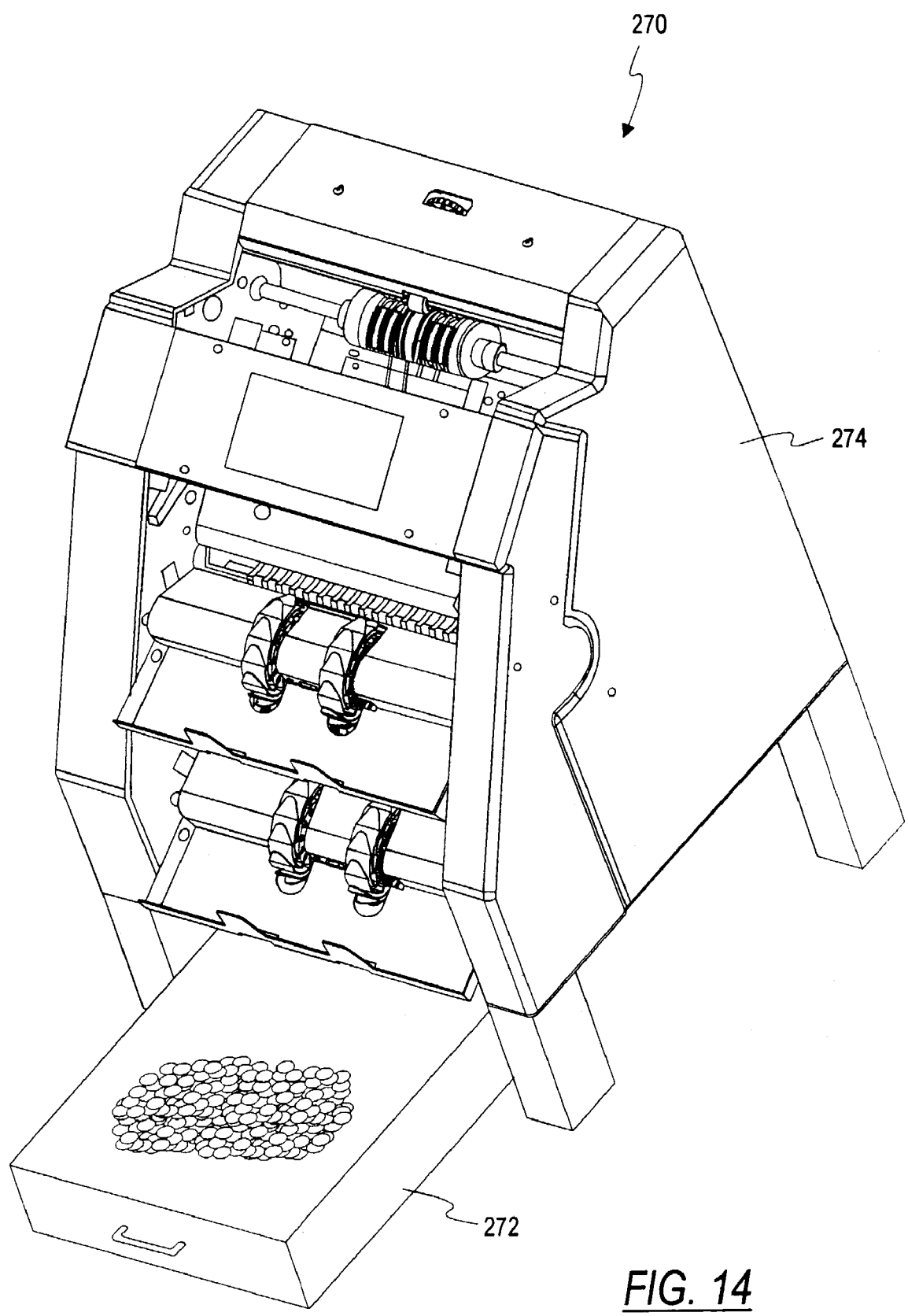
FIG. 14 is a perspective of a currency bill and coin processing system according to another alternative embodiment of the present invention.

Referring also to FIG. 14, there is shown an alternative embodiment of the currency bill and coin processing system 270 including a coin scale 272 and a double-pocket currency bill processing device 934. Like the system 50 illustrated in FIGS. 13 and 14, the coin scale 272 is moveable between a storage position and an operating position. According to one embodiment of the currency bill and coin processing system 270, the coin scale 272 is disposed in large-part beneath the double-pocket device 274 when in the storage position. Thus, the footprint occupied by the currency bill and coin processing system 270 when the coin scale 272 is in the storage position is substantially the same as the footprint of the double-pocket device 274. For example, in some embodiments, the footprint of the system 270 is about 150 in$^2$. In other embodiments, the footprint of the system 270 ranges between about 150 in$^2$ and about 300 in$^2$.

Although the embodiments of the currency bill and coin processing system 50 shown in FIGS. 12–14 are shown with a single and double-pocket devices, other multi-pocket currency bill processing devices can be used in connection with the present invention including the multi-pocket devices shown FIGS. 7–9. According to one embodiment of the currency bill and coin processing system 50, regardless of the particular multi-pocket device used as the currency bill processing device 52, the coin scale 54 is disposed in large-part beneath the multi-pocket device when in the storage position and the footprint occupied by the currency bill and coin processing system 50 when the coin scale 54 is in the storage position is substantially equivalent to the footprint of the multi-pocket device. According to one embodiment of the currency bill and coin processing system 50, the footprint of the system 50 ranges between about 150 in$^2$ (about 1 ft$^2$) and about 375 in$^2$ when the currency bill processing device 52 is a multi-pocket device. According to another embodiment of the currency bill and coin processing system 50, the footprint of the system 50 is ranges between about 200 in$^2$ and about 375 in$^2$ when the currency bill processing device 52 is a multi-pocket device. According to yet another embodiment of the currency bill and coin processing system 50, the footprint of the system 50 is ranges between about 222 in$^2$ and about 480 in$^2$ when the currency bill processing device 52 is a multi-pocket device. And in other alternative embodiments of the system 50, the footprint of the system 50 is about 1 ft$^2$, less than about 1.5 ft$^2$, less than about 2 ft$^2$, or less than about 2.5 ft$^2$.

In yet another alternative embodiment of the present invention, the coin scale 54 is not disposed beneath the currency bill processing device 52. Rather, the coin scale 54 is place next to the currency bill processing device 52, for example. Alternatively still, the coin scale 54, which is still communicatively linked to the currency bill processing device 52, is set away from the currency bill processing device 52. Because the currency bill processing device 52 and coin scale 54 are relatively compact, the overall footprint of the currency bill and coin processing system 50 remains small in these embodiments.

Figure 15:
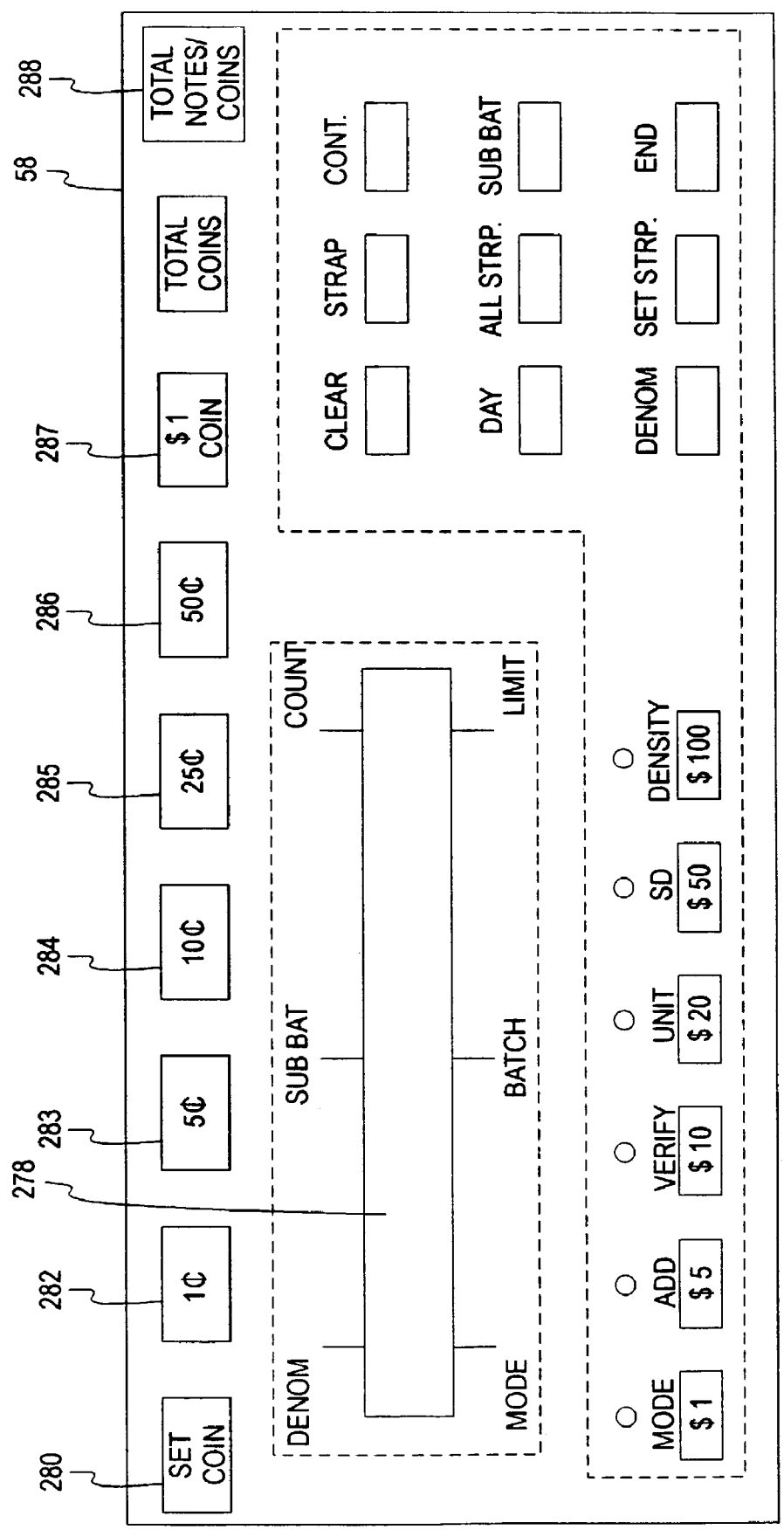
FIG. 15 is a front view of an operator interface for use with one embodiment of the currency bill and coin processing system of FIG. 1.

Referring now to FIG. 15, an operator interface 58 for use with one embodiment of the currency bill and coin processing system 50 of the present invention is shown. The operator interface 58 includes an LCD display 278 and a plurality of keys for inputting operational instructions to both the currency bill processing device 52 and the coin scale 54. In the depicted embodiment, some of the keys of the operator interface 58 keys are specific to the currency bill note processing device 52 and others are specific to the coin scale 54. For example, the 1¢, 5¢, 10¢, 25¢, 50¢ and $1 keys 282–287 disposed along the top of the operator interface 58 are all coin scale 54 specific keys. The operator depresses the "Set Coin" key 280 and then selects the key corresponding the particular coin denomination to be weighed: 1¢ key 282 for pennies, 5¢ key 283 for nickels, 10¢ key 284 for dimes, 25¢ key 285 for quarters, 50¢ key 286 for half-dollar coins and $1 key 287 for dollar coins. Other keys, such a "total notes/coins" key 288 cause the currency bill and coin processing system 50 to sum currency bill total and coins totals. As discussed above, according to an alternative embodiment, the operator interface 58 can comprise a touch screen device. In other alternative embodiments, the operator interface comprises a display and a small number of keys that allow the operator to scroll through and select displayed options.

In addition to operational instructions, the operator interface 58 can also receive identification information from the operator of the system 50 including batch identification information, operator identification information, store identification information, operator shift identification information, etc. For example, an operator of the system 50 may enter a number that identifies a particular cash register at a store, a number that identifies the store, or both. Further, according an alternative embodiment of the system 50, an operator may input, via the operator interface 58, a beginning balance of the cash drawer to be balanced which then compared to the totals determined from the currency bill and coin processing by the system 50. Additionally, the operator interface 58 may receive security information such as a password or number from an operator in addition to an identification information.

Figure 16:
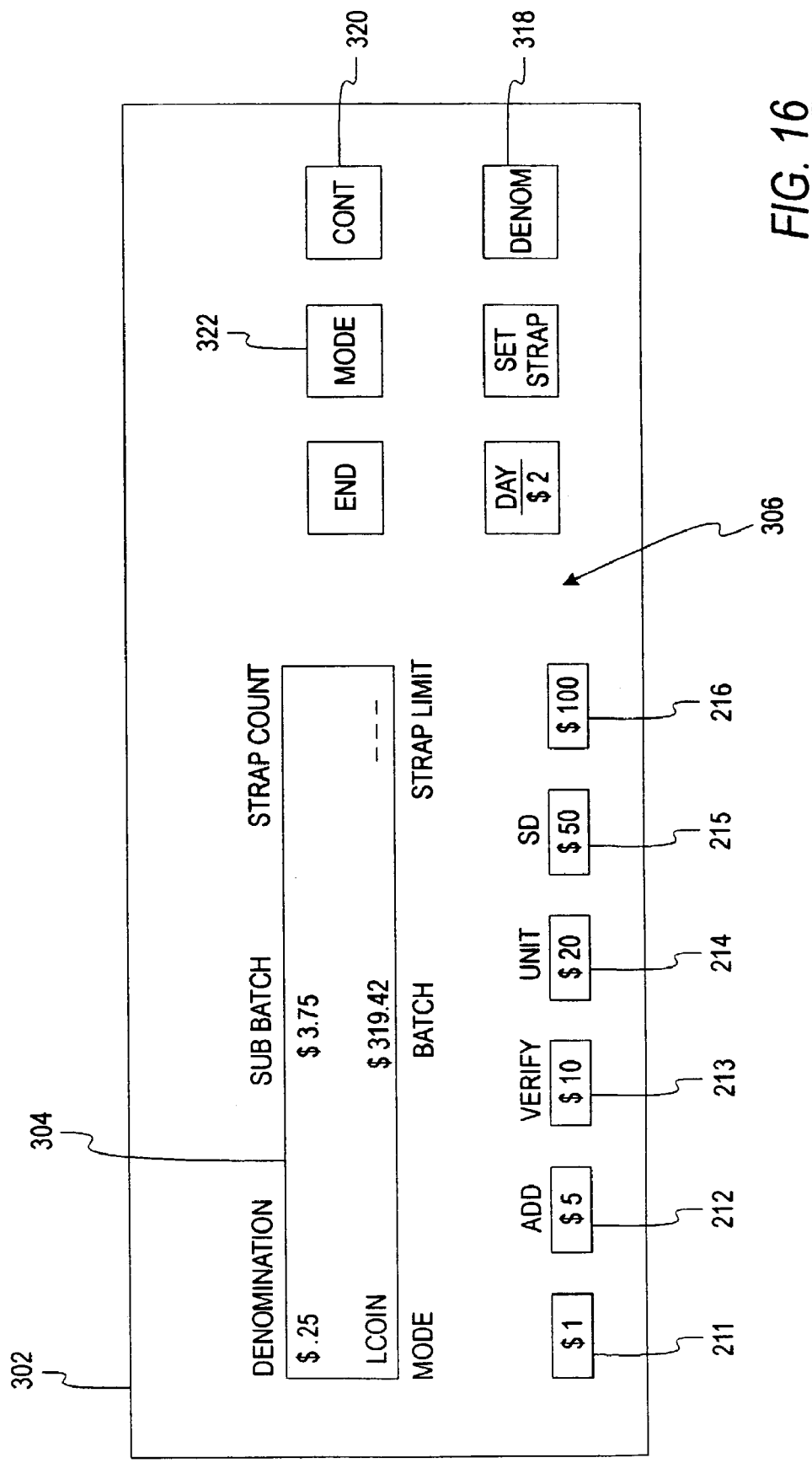
FIG. 16 is a front view of an operator interface for use with another embodiment of the currency bill and coin processing system of FIG. 1.

Referring now to FIG. 16, an operator interface 302 for use with an alternative embodiment of the currency bill and coin processing system 50 of the present invention is shown. The operator interface 302 includes an LCD display 304 and a plurality of keys 406 for inputting operational instructions to both the currency bill processing device 52 and the coin scale 54. Some of the keys including the bill denominations keys 311–316 of the operator interface 302 are specific to the currency bill note processing device 52. Other keys 406, such as a "DENOM" key 318, are relevant to both the currency bill processing device 52 and the coin scale 54. According to one embodiment, the DENOM key 318 is used to scroll through the coin and dollar denominations (1¢, 5¢, 10¢, 25¢, 50¢ and 100¢ coins; $1, $2, $5, $10, $20, $50 and $100 bills). When the appropriate denomination is displayed on the display 304, the operator selects the CONT (continue) key 320, or an enter key (not shown), to designate that denomination as the denomination to be processed.

According to one embodiment of the present invention, the dollar denomination keys 211–216 are used to reconcile "no call" currency bills. In an embodiment wherein the currency bill processing device 52 is adapted to denominate the currency bills but the denomination of a currency bill cannot be determined by the 52, the device 52 generates a "no call" error signal. The operator can inspect the note and then depress a dollar denomination key 211–216 causing the dollar amount selected to be added to the running total. Alternatively, according to an alternative embodiment of the present invention, the operator scrolls through the denominations using the DENOM key 318 by depressing the DENOM key 318 until the denomination of the "no call" currency bill is displayed and then depresses the CONT key 320 so that the currency bill is included in the running total.

A "MODE" key is used to scroll through a plurality of operating modes of the currency bill and coin processing system 50. For example, modes such as "MIXED," "SORT" and "STRANGER" are used to control the operation of the currency bill processing device 52. Further details of these modes of operation, and other modes of operation for the currency bill coin processing device 52, are described in U.S. Pat. No. 6,278,795, which is incorporated herein by reference. Further, modes such as "LCOIN" (for weighing loose coins), "RCOIN" (for weighing rolled coins), "CCOIN" (for weighing coins in a container) and "STRAP" (for weighing strapped currency) may be scrolled through using the MODE key 322 for operating the coin scale 54. According to one embodiment of the currency bill and coin processing system 50, the CCOIN mode of operation accounts for the tare weight of a known (e.g., commonly used) container.

Figure 17:
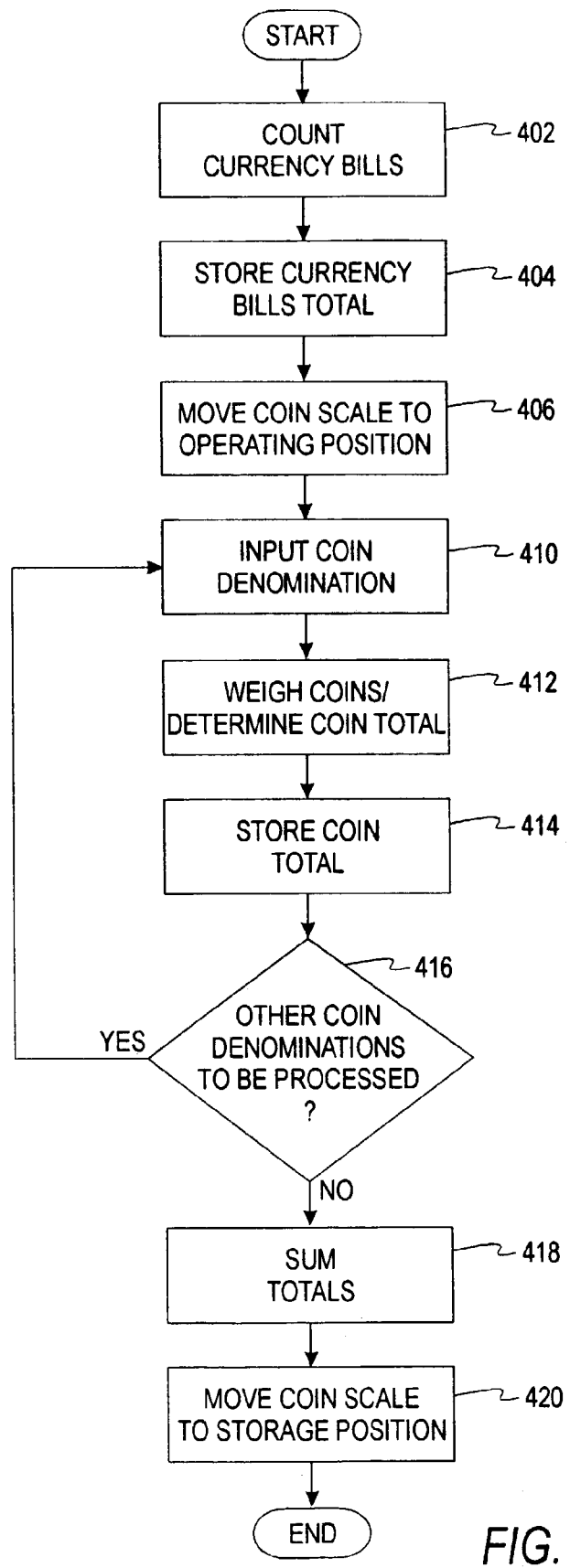
FIG. 17 is a flow chart depicting the operation of one embodiment of the present invention.

Referring to FIG. 17, the operation of the currency bill and coin processing system 50 will not be described according to one embodiment of the present invention. One application of the currency bill and coin processing system 50 is in a retail setting (e.g., a grocery store) where cash transactions are commonplace. Typically in retail settings, cashiers operate cash registers that hold cash (coins and currency bills) in a cash till drawer. Coins and currency bills are segregated by denomination in separate compartments in the cash till drawer. At certain times during the day such as at the end of a cashier's shift or at predetermined intervals, the cash till drawer of each cash registered is "counted-down"—a process whereby cash in the cash till drawer is counted and then compared to the drawer's beginning balance and the day's sales/receipts. Counting-down a cash drawer is a time consuming process and, because the currency bills and coins are typically manually totaled, it is a process wrought with opportunity for human error.

A cashier counting down a cash till drawer can save time and reduce errors by using the coin and currency bill processing system 50. The cashier begins, for example, by first counting the currency bills in the cash till drawer at step 402. The currency bills from the drawer are stacked and placed in the input receptacle the input receptacle 112 of the currency bill processing device 50 (e.g., the single-pocket device 100 of FIG. 2). The currency bill processing device 50 counts currency bills and determines a currency bill total that is displayed on the operator interface 58 and is stored in the memory 57 of the coin and currency bill processing system 50 at step 404. The currency bill processing device 52 may also evaluate the authenticity of each of the currency bills according to an alternative embodiment of the present invention. In embodiments of the present invention wherein the currency bill processing device 52 is a note counter, each currency bill denomination must be individually processed and the totals corresponding to the individual denominations are stored in the memory 57. For example, first the $1 currency bills are placed in the input receptacle and counted by the device 52, then the $5 currency bills are placed in the input receptacle and counted by the device 52, etc. In embodiments where the device 52 is capable of determining the denomination of currency bills, all currency bills in a cash drawer may be placed in the input receptacles at the same time and a total vale can be determined by the device 52.

Continuing with the present example, after the currency bills have been counted, the coins are then counted. The coin scale 54 is moved from its storage position beneath the currency bill processing device 52 to the operating position at step 406, wherein the coin scale 54 is extending out from beneath the currency bill processing device 52. It is noted that the coins and currency bills can be processed in any order. Further, coin processing can be commenced while the currency bill processing is still underway according to some embodiments of the present invention.

A group of coins of a first coin denomination such as pennies, for example, are removed from their individual compartment in the cash till drawer and placed on the coin scale 54. The denomination of coin to be processed is input to the system 50 by depressing the "Set Coin" key 280 of the operator interface 58 (FIG. 15) to prompt the coin scale 54 that the denomination of coins to be weighed is to be entered and then depressing the 1¢ cent key 282 is for assigning the penny denomination as the coin denomination to be processed at step 410. Alternatively, the coin scale 52 runs the operator through a sequence of denominators and first prompts the operator to weigh pennies, for example. In such an embodiment, it is not necessary for the operator to input the coin denomination to be processed or to use a "Set Coin" key.

The coin scale 52 weighs the pennies and provides a total value for the pennies at step 412, which is communicated to the cashier via the operator interface 58. The penny total is then stored in the memory 57 of the currency bill and coin processing system 50 at step 414. Alternatively, the pennies are added to a running coin total (which in the present example consists only of pennies thus far) or an overall running total wherein the penny total is added to the currency bill total. In addition to a penny total, the operator interface 58 can also display the total number of the pennies and the total weight of the pennies. Further, a hardcopy of these totals can be provided by the optional printer 60. After the penny total is determined, the operator removes the pennies from the coin scale 54.

If there are other coin denominations to be processed, the cashier then proceeds to weigh another denomination of coins such as nickels, for example, at step 416. The cashier places the nickels on the coin scale 54 and, in a similar manner to the pennies, a nickel total is determined. The nickel total is stored in the memory of the system 57, is added to the running coin total and/or is added to the overall running total. In situations wherein the quantity of nickels, for example, is too voluminous for the coin scale 54 to handle in one load, the nickels can be processed in more than one batch.

The cashier proceeds to count all the other coin denominations that are left in the cash till drawer (e.g., dimes, quarters, half-dollar coins and dollar coins). After completing processing each of the coin denominations, the operator can depress the "Total Notes/Coins" key 288 causing the system 50 to sum the totals corresponding with the individual coin denominations and currency bills at step 418, which represents the aggregate amount of each in the cash till drawer. The cashier can then move the coin scale 54 back to the storage position beneath the currency bill processing device 52 at step 420 so that the currency bill and coin processing system consumes less table-space.

In some applications, such as in the retail settings, the coins in a cash drawer may include rolled coins. For example, the cashier may have rolled coins on hand in the cash drawer in anticipation of running out of a particular coin denomination during the day. According to one embodiment of the currency bill and coin processing system, the coin scale is also able to weigh and count rolled coins. The rolled coins of each denomination are weighed alone with the loose coins of the same denomination or are weighed separately. Either way, the rolled coins are included in the aggregate total.

In other applications, particularly in a banking environment, a bank teller may also have strapped, banded, bundled, or clipped stacks of currency to be processed along with the loose currency. The bank teller can manually input the totals corresponding to each total via the operator interface 58 because the amount of currency bills in a strapped stack of currency bills is typically known. For example, it is commonplace to include one-hundred currency bills in a strapped stack of currency bills. Alternatively, the strapped stacks are unstrapped and processed by the currency bill processing device 52. Alternatively still, the coin scale 54 can weigh the strapped stack of currency bills and determine a corresponding total. The teller places the strapped currency bills, one denomination at a time, on the coin scale 54 and inputs via the operator interface 58 the denomination of currency bills on the coin scale 54. For example, the operator interface 58 may include a $1 key for designating the $1 denomination for processing strapped stacks of currency bills. The stack of currency bills is then weighed and the coin scale 54 calculates the dollar amount corresponding to the strapped stack of currency bill. A strapped $1 currency bill total is then stored in the memory 57 of the system 50. Subsequent stacks of currency bills are processed in a like manner. After all the coins (loose, bagged, and rolled) have been processed and all the currency bills (loose and strapped) have been processed, the operator selects the "Total Notes/Coin" key 288 on the operator interface 58 and the aggregate total of all coins and currency bills processed is displayed by the operator interface. Alternatively, where the coin scale 54 automatically checks through a sequence of coin denominations to be weighed, the coin scale 54 may automatically sum the totals after exhausting the list of denominations. In such an embodiment, a total key 288 may not be necessary as the system 50 can automatically determine the totals upon exhausting the sequence of denominations. Alternatively still, the system 50 maintains a running totals so that after each coin denomination of coin is weighed, or each currency bill denomination is processed, the system adds the total to previously determined totals.

In an alternative embodiment of the present invention, the currency bill and coin processing system 50 is communicatively linked to an internal computer system of the retail store or the bank where the system 50 resides. Therefore, in the previous example wherein a cashier counted down a cash drawer, the aggregate total determined for the cash drawer is automatically compared to the drawer's beginning balance and sales activity which is stored on the internal computer system.

While the currency bill and coin processing system 50 has been described in terms of a compact or table-top device, the currency bill and coin processing system 50 can include a high-capacity currency bill processing devices for certain applications that may require the ability to process currency bills at a higher capacity. A high-capacity currency bill processing device which can be communicatively coupled to a coin scale 54 according to an alternative embodiment of the present invention is described in U.S. Pat. No. 6,398,000 ("Currency Handling System Having Multiple Output Receptacles"), which is incorporated herein by reference in its entirety.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A compact system for processing currency bills and coins, the system comprising:
    a compact currency bill processing device for counting currency bills of a plurality of denominations, the currency bill processing device having an input receptacle for receiving a stack of currency bills and a transport mechanism adapted to transport the currency bills, one at a time, from the input receptacle past an evaluation unit to at least one output receptacle, the evaluation unit being adapted to determine the denomination of each of the currency bills;
    a coin scale adapted to receive at least one group of coins of a single denomination and to determine a coin total for the at least one received group corresponding to the value of the coins in the received group; and
    a processor communicatively linked to the currency bill processing device and the coin scale, the processor being adapted to receive a currency bill total from the currency bill processing device and the coin total from the coin scale, the processor being adapted to determine an aggregate total corresponding to the sum of the received currency bill total and the coin total.

2. The system of claim 1 wherein the currency bill processing device has a width of about 11 inches, a depth of about 12 inches and a height of about 9.5 inches.

3. The system of claim 1 wherein the currency bill processing device has a width ranging from about 10 inches to about 15 inches, a depth ranging from about 15 inches to about 25 inches and a height ranging between about 20 inches and 25 inches.

4. The system of claim 1 wherein the coin scale is moveable between a storage position and an operating position, the coin scale being disposed below the currency bill processing device when in the storage position, the coin scale extending out from underneath the currency bill processing device when in the operating position.

5. The system of claim 4 wherein the coin scale is disposed substantially beneath the currency bill processing device when in the storage position.

6. The system of claim 4 where a footprint of the currency bill processing device is substantially equivalent to a footprint of the compact system for processing currency bills and coins when the coin scale is in the storage position.

7. The system of claim 1 wherein the least one output receptacle is a single output receptacle.

8. The system of claim 1 wherein the least one output receptacle comprises two output receptacles.

9. The system of claim 1, wherein the at least one group of coins comprises a plurality of groups of coin, each group consisting of coins from a single denomination.

10. The system of claim 1 further comprising an operator interface communicatively linked to the processor adapted to display information to an operator and to receive input from an operator indicative of the denomination of the coins in the at least one received group of coins.

11. The system of claim 10 wherein the at least one group of coins comprises a first group of coins of a first coin denomination and a second group of coins of a second denomination, the operator interface being adapted to received input from an operator indicative of the first coin denomination, the coin scale being adapted to calculate a first total corresponding to the value of the first group of coins upon receipt of the first group of coins and upon receipt by the operator interface of input indicative of the second coin denomination, the coin scale being adapted to calculate a second total corresponding to the value of the second group of coin upon receipt of the second group of coins and upon receipt by the operator interface of input indicative of the fist coin denomination, the aggregate total corresponding to the sum of the received currency bill total and the first and second coin totals.

12. The system of claim 1 wherein the processor is adapted to prompt an operator to place a group of coins of a specific denomination on the coin scale.

13. The system of claim 1, further comprising an interface communicatively linked to the processor, the interface having a plurality of keys for manually receiving input from an operator indicative of processing related information.

14. The system of claim 13, wherein the plurality of keys is selected from a group consisting of physical keys and touch-screen keys.

15. The system of claim 13, wherein the interface is a keyboard.

16. The system of claim 13, wherein the interface is a keypad.

17. The system of claim 13, wherein the interface is a touch-screen.

18. The system of claim 13, wherein the interface is located separate from at least one of the currency bill processing device and the coin scale.

19. The system of claim 13, wherein the interface is integrated with at least one of the currency bill processing device and the coin scale.

20. The system of claim 1, further comprising a printer communicatively linked to the processor adapted to receive currency bills and coin information from the processor and to provide a hardcopy of the currency bills and coin information.

21. The system of claim 20, wherein the printer is located separate from at least one of the currency bill processing device and the coin scale.

22. The system of claim 1, further comprising:
an interface communicatively linked to the processor, the interface having a plurality of keys for manually receiving input from an operator indicative of currency bills and coin information; and
a printer communicatively linked to the processor adapted to provide a hardcopy of currency bills and coin information.

23. The system of claim 22, wherein the plurality of keys is selected from a group consisting of physical keys and touch-screen keys.

24. The system of claim 22, wherein the interface is a keyboard.

25. The system of claim 22, wherein the interface is a keypad.

26. The system of claim 22, wherein the interface is a touch-screen.

27. The system of claim 22, wherein at least one of the interface and the printer is located separate from at least one of the currency bill processing device and the coin scale.

28. The system of claim 22, wherein at least one of the interface and the printer is integrated with at least one of the currency bill processing device and the coin scale.

29. The system of claim 1, further comprising a personal computer communicatively linked to the processor adapted to receive currency bills and coin information from the processor.

30. A method for processing currency bills and coins using a compact currency bill and coin processing system, the method comprising:
receiving a stack of currency bills in an input receptacle of a compact currency bill processing device;
transporting each of the currency bills, one at a time, from the input receptacle past an evaluation unit to at least one output receptacle of the currency bill processing device;
determining a currency bill total corresponding to the value of the currency bills;
receiving a group of coins of a single denomination with a coin scale;
determining a coin total corresponding to the value of the coins in the group with the coin scale after receiving input from the operator; and
summing the coin total and the currency bill total.

31. The method of claim 30 wherein the compact currency bill processing device has a width of about 11 inches, a depth of about 12 inches and a height of about 9.5 inches.

32. The method of claim 30 wherein the compact currency bill processing device has a width ranging from about 10 inches to about 15 inches, a depth ranging from about 15 inches to about 25 inches and a height ranging between about 20 inches and 25 inches.

33. The method of claim 30 further comprising moving the coin scale from a storage position to a operating position before receiving a group of coins, wherein the coin scale is in the storage position is disposed substantially beneath the currency bill processing device, the coin scale is extending out from beneath the currency bill processing device in the operating position.

34. The method of claim 30 further comprising receiving input from an operator via an operator interface indicative of the denomination of coins in the group.

35. The method of claim 30 further comprising prompting an operator to place a group of coins of a specific denomination on the coin scale.

36. A method for processing currency bills and coins using a compact currency bill and coin processing system, the method comprising:
receiving a stack of currency bills in an input receptacle of a compact currency bill processing device;
transporting each of the currency bills, one at a time, from the input receptacle past an evaluation unit to at least one output receptacle of the currency bill processing device;
determining a currency bill total corresponding to the value of the currency bills;
receiving a group of coins of a single denomination with a coin scale;
determining a first coin total corresponding to the value of the coins in the a group with the coin scale;
receiving another group of coins of a single denomination with a coin scale;
determining a second coin total corresponding to the value of the coins in the another group with the coin scale; and
summing the currency bill total, the first coin total and the second coin total.

37. The method of claim 36 wherein the compact currency bill processing device has a width of about 11 inches, a depth of about 12 inches and a height of about 9.5 inches.

38. The method of claim 36 wherein the compact currency bill processing device has a width ranging from about 10 inches to about 15 inches, a depth ranging from about 15 inches to about 25 inches and a height ranging between about 20 inches and 25 inches.

39. The method of claim 36 further comprising moving the coin scale from a storage position to a operating position before receiving a group of coins, wherein the coin scale is in the storage position is disposed substantially beneath the currency bill processing device, the coin scale is extending out from beneath the currency bill processing device in the operating position.

40. The method of claim 36 further comprising receiving input from an operator via an operator interface indicative of the denomination of coin in the group of coins.

41. The method of claim 36 further comprising prompting an operator to place a group of coins of a specific denomination on the coin scale prior to receiving coins.

42. A compact system for processing currency bills and coins adapted to rest on a tabletop, the system comprising:
a compact currency bill processing device for counting currency bills of a plurality of denominations, the currency bill processing device having an input receptacle for receiving a stack of currency bills and a transport mechanism adapted to transport the currency bills, one at a time, from the input receptacle past an evaluation unit to at least one output receptacle, the evaluation unit being adapted to determine the denomination of each of the currency bills and to determine a currency bill total corresponding to the value of the currency bills;
a coin scale adapted to receive one or more groups of coins, one group at a time, and to determine a coin total for each received group corresponding to the value of the coins in the received group, wherein each group consists of coins of a single denomination, the coin scale being disposed generally between the currency bill processing device and the tabletop, the coin scale being moveable between a storage position and an operating position, the coin scale being disposed beneath the currency bill processing device in the storage position, the coin scale extending out from underneath the currency bill processing device in the operating position; and a processor communicatively linked to the currency bill processing device and the coin scale, the processor being adapted to receive a currency bill total from the currency bill processing device and one or more coin totals from the coin scale, the processor being adapted to determine an aggregate total corresponding to the sum of the received currency bill total and one or more coin totals.

43. The system of claim 42 wherein the currency bill processing device has a width of about 11 inches, a depth of about 12 inches and a height of about 9.5 inches.

44. The system of claim 42 wherein the currency bill processing device has a width ranging from about 10 inches to about 15 inches, a depth ranging from about 15 inches to about 25 inches and a height ranging between about 20 inches and 25 inches.

45. The system of claim 42 wherein the coin scale is coin scale being disposed substantially beneath the currency bill processing device when in the storage position.

46. The system of claim 45 where a footprint of the currency bill processing device is substantially equivalent to a footprint of the compact system for processing currency bills and coins when the coin scale is in the storage position.

47. The system of claim 42 wherein the least one output receptacle is a single output receptacle.

48. The system of claim 42 wherein the least one output receptacle comprises two output receptacles.

49. The system of claim 48 further comprising an operator interface communicatively linked to the processor adapted to display information to an operator, the operator interface being adapted to receive input from an operator indicative of the denomination of the coins in the at least one received group of coins, the operator interface being adapted to receive input from an operator indicative of the denomination of the currency bills in the at least one received group of currency bills.

50. The system of claim 42 further comprising an operator interface communicatively linked to the processor adapted to display information to an operator and to receive input from an operator indicative of the denomination of the coins in a group of coins received by the coin scale.

51. The system of claim 50 wherein the one or more groups of coins comprises a first group of coins of a first coin denomination and a second group of coins of a second denomination, the operator interface being adapted to received input from an operator indicative of the first coin denomination, the coin scale being adapted to calculate a first total corresponding to the value of the first group of coins upon receipt of the first group of coins and upon receipt by the operator interface of input indicative of the fist coin denomination, the coin scale being adapted to calculate a second total corresponding to the value of the second group of coin upon receipt of the second group of coins and upon receipt by the operator interface of input indicative of the fist coin denomination, the aggregate total corresponding to the sum of the received currency bill total and the first and second coin total.

52. The system of claim 42 wherein the processor is adapted to prompt an operator to place coins of a specific denomination on the coin scale.

53. A compact system for processing currency bills and coins, the system comprising:

a compact currency bill processing device for counting currency bills, the currency bill processing device being adapted to receive at least one stack of currency bills of a single denomination, the currency bill processing device having an input receptacle for receiving the at least one stack of currency bills and a transport mechanism adapted to transport the currency bills, one at a time, from the input receptacle past an evaluation unit to at least one output receptacle, the evaluation unit being adapted to count of the currency bills and to determine a currency bill total for the at least one received stack corresponding to the value of the currency bills in the received group;

a coin scale adapted to receive at least one group of coins of a single denomination and to determine a coin total for the at least one received group corresponding to the value of the coins in the received group; and a processor communicatively linked to the currency bill processing device and the coin scale, the processor being adapted to receive the currency bill total from the currency bill processing device and the coin total from the coin scale, the processor being adapted to determine an aggregate total corresponding to the sum of the received currency bill total and the coin total.

54. The system of claim 53 wherein the currency bill processing device has a width of about 11 inches, a depth of about 12 inches and a height of about 9.5 inches.

55. The system of claim 53 wherein the currency bill processing device has a width ranging from about 10 inches to about 15 inches, a depth ranging from about 15 inches to about 25 inches and a height ranging between about 20 inches and 25 inches.

56. The system of claim 53 wherein the coin scale is movable between a storage position and an operating position, the coin scale being disposed below the currency bill processing device when in the storage position, the coin scale extending out from underneath the currency bill processing device when in the operating position.

57. The system of claim 53 wherein the coin scale is disposed substantially beneath the currency bill processing device when in the storage position.

58. The system of claim 56 where a footprint of the currency bill processing device is substantially equivalent to a footprint of the compact system for processing currency bills and coins when the coin scale is in the storage position.

59. The system of claim 53 wherein the least one output receptacle is a single output receptacle.

60. The system of claim 53 wherein the least one output receptacle comprises two output receptacles.

61. The system of claim 53 wherein the at least one groups of coins comprises a plurality of groups of coins, each group consisting of coins of a single denomination.

62. The system of claim 53 further comprising an operator interface communicatively coupled to the processor for receiving input from an operator indicative of the of the denomination of the group of coins received by the coin scale.

63. The system of claim 53 further comprising an operator interface communicatively coupled to the processor for receiving input from an operator indicative of the of the denomination of the stack of currency bills received from the currency bill processing device.

64. The system of claim 53 wherein the processor is adapted to prompt an operator to place a stack of bills of a specific denomination in the input receptacles of the currency bill processing device.

65. The system of claim 53 wherein the processor is adapted to prompt an operator to place a group of coins of a specific denomination on the coin scale.

66. The system of claim 53, wherein the at least one stack of currency bills comprises a plurality of stacks of currency bills, each stack consisting of currency bills of a single denomination.

67. A compact system for processing currency bills and coins, the system comprising:
- a compact currency bill processing device for counting currency bills of a plurality of denominations, the currency bill processing device having an input receptacle for receiving a stack of currency bills and a transport mechanism adapted to transport the currency bills, one at a time, from the input receptacle past an evaluation unit to at least one output receptacle, the evaluation unit being adapted to determine the denomination of each of the currency bills;
- a coin scale adapted to receive at least one group of coins of a single denomination and to determine a coin total for the at least one received group corresponding to the value of the coins in the received group;
- a processor communicatively linked to the currency bill processing device and the coin scale, the processor being adapted to receive a currency bill total from the currency bill processing device and the coin total from the coin scale, the processor being adapted to determine an aggregate total corresponding to the sum of the received currency bill total and the coin total;
- an interface communicatively linked to the processor, the interface having a plurality of keys for manually receiving input from an operator indicative of processing related information;
- a printer communicatively linked to the processor adapted to provide a hardcopy of currency bills and coin information; and
- a personal computer communicatively linked to the processor adapted to receive currency bills and coin information from the processor.

68. The system of claim 67, wherein the plurality of keys is selected from a group consisting of physical keys and touch-screen keys.

69. The system of claim 67, wherein the interface is a keyboard.

70. The system of claim 67, wherein the interface is a keypad.

71. The system of claim 67, wherein the interface is a touch-screen.

72. The system of claim 67, wherein the interface is located separate from at least one of the currency bill processing device and the coin scale.

73. The system of claim 67, wherein the interface is integrated with at least one of the currency bill processing device and the coin scale.

* * * * *